United States Patent
Simon et al.

(10) Patent No.: US 11,244,105 B2
(45) Date of Patent: Feb. 8, 2022

(54) EFFICIENT COPY PASTE IN A COLLABORATIVE SPREADSHEET

(71) Applicant: Google Inc., Mountain View, CA (US)

(72) Inventors: Benjamin Wolfe Simon, Seattle, WA (US); Amod Karve, Clifton, NJ (US); Joshua Ari Danziger, Metuchen, NJ (US); Zachary Erik Lloyd, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 733 days.

(21) Appl. No.: 14/560,954

(22) Filed: Dec. 4, 2014

(65) Prior Publication Data

US 2016/0162461 A1    Jun. 9, 2016

(51) Int. Cl.
*G06F 40/18* (2020.01)
*G06F 40/197* (2020.01)
*G06F 3/0484* (2013.01)

(52) U.S. Cl.
CPC ............ *G06F 40/18* (2020.01); *G06F 3/0484* (2013.01); *G06F 40/197* (2020.01)

(58) Field of Classification Search
CPC .................................................. G06F 17/246
USPC ........................................................ 715/220
See application file for complete search history.

(56) References Cited

U.S. PATENT DOCUMENTS

| | | | |
|---|---|---|---|
| 6,006,239 A | 12/1999 | Bhansali et al. | |
| 8,583,614 B1 | 11/2013 | Dilts et al. | |
| 8,656,290 B1 | 2/2014 | Greenspan et al. | |
| 9,747,582 B2* | 8/2017 | Hunter | G06Q 10/101 |
| 2002/0049784 A1* | 4/2002 | Bauchot | G06F 17/246 715/212 |
| 2009/0112937 A1* | 4/2009 | Campbell | G06F 17/246 |
| 2012/0101980 A1 | 4/2012 | Taleghani et al. | |
| 2013/0151940 A1* | 6/2013 | Bailor | G06F 17/24 715/229 |
| 2013/0212250 A1 | 8/2013 | Kleppner et al. | |

OTHER PUBLICATIONS

International Search Report and Written Opinion dated Mar. 21, 2016 in PCT/US2015/062773, filed Nov. 25, 2015 (12 pages).

* cited by examiner

*Primary Examiner* — Kavita Stanley
*Assistant Examiner* — Tionna M Burke
(74) *Attorney, Agent, or Firm* — Lowenstein Sandler LLP

(57) ABSTRACT

Systems and methods are disclosed herein for editing a collaborative spreadsheets hosted on a server. Multiple users may edit the spreadsheet, resulting in situations of intersecting or conflicting edits. A change provided by one user may intersect the cells affected by a change provided by another user. In these cases, one user's change is transformed against the other user's change. In this manner, the conflict is resolved and both changes can be applied to the spreadsheet. Each user device may perform these transforms, and the server may also perform these transforms. This can result in transmission of a reduced volume of data over a network between the devices and the server, in comparison with other methods.

11 Claims, 15 Drawing Sheets

710

|   | A | B | C | D | E |
|---|---|---|---|---|---|
| 1 | Item | Cost | Quantity | Total | |
| 2 | Pear | 2 | 2 | = B2*C2 | |
| 3 | Peach | 3 | 4 | | |
| 4 | Orange | 1 | 2 | | |
| 5 | Banana | 1 | 3 | | |
| 6 | | | | | |

Dave :
Insert a Row
Between Rows 3 and 4       — 702

Charlie :
Copy Cell D2
to Range D3:D5       — 704

720

|   | A | B | C | D | E |
|---|---|---|---|---|---|
| 1 | Item | Cost | Quantity | Total | |
| 2 | Pear | 2 | 2 | = B2*C2 | |
| 3 | Peach | 3 | 4 | = B3*C3 | |
| 4 | | | | | |
| 5 | Orange | 1 | 2 | = B5*C5 | |
| 6 | Banana | 1 | 3 | = B6*C6 | |

|   | A | B | C | D | E |
|---|---|---|---|---|---|
| 1 | Item | Cost | Quantity | Total | |
| 2 | Pear | 2 | 2 | = B2*C2 | |
| 3 | Peach | 3 | 4 | | |
| 4 | Orange | 1 | 2 | | |
| 5 | Banana | 1 | 3 | | |
| 6 | | | | | |

812
814
816

Charlie :
Copy Cell D2
to Range D3:D5 — 802

Dave :
Delete Row 4 — 804

820

|   | A | B | C | D | E |
|---|---|---|---|---|---|
| 1 | Item | Cost | Quantity | Total | |
| 2 | Pear | 2 | 2 | = B2*C2 | |
| 3 | Peach | 3 | 4 | = B3*C3 | |
| 4 | Banana | 1 | 3 | = B4*C4 | |
| 5 | | | | | |
| 6 | | | | | |

|   | A | B | C | D | E |
|---|---|---|---|---|---|
| 1 | Item | Cost | Quantity | Total | |
| 2 | Pear | 2 | 2 | = B2*C2 | |
| 3 | Peach | 3 | 4 | | |
| 4 | Orange | 1 | 2 | | |
| 5 | Banana | 1 | 3 | | |
| 6 | | | | | |

912
914

Charlie :
Copy Cell D2
to D3:D5                                902

Dave :
Change Formula
in D2 To: =B2*C2*1.09                   904

920

|   | A | B | C | D | E |
|---|---|---|---|---|---|
| 1 | Item | Cost | Quantity | Total | |
| 2 | Pear | 2 | 2 | = B2*C2*1.09 | |
| 3 | Peach | 3 | 4 | = B3*C3*1.09 | |
| 4 | Orange | 1 | 2 | = B4*C4*1.09 | |
| 5 | Banana | 1 | 3 | = B5*C5*1.09 | |
| 6 | | | | | |

| | A | B | C | D | E |
|---|---|---|---|---|---|
| 1 | Item | Cost | Quantity | Total | |
| 2 | Pear | 2 | 2 | = B2*C2 | |
| 3 | Peach | 3 | 4 | | |
| 4 | Orange | 1 | 2 | | |
| 5 | Banana | 1 | 3 | | |
| 6 | | | | | |

- 1012 (D2)
- 1014 (D3:D5)

Charlie :
Copy Cell D2
to D3:D5
— 1002

Dave :
Change Formula
in D4 To: =B4*C4*1.09
— 1004

1020

| | A | B | C | D | E |
|---|---|---|---|---|---|
| 1 | Item | Cost | Quantity | Total | |
| 2 | Pear | 2 | 2 | = B2*C2 | |
| 3 | Peach | 3 | 4 | = B3*C3 | |
| 4 | Orange | 1 | 2 | = B4*C4*1.09 | |
| 5 | Banana | 1 | 3 | = B5*C5 | |
| 6 | | | | | |

|   | A ⌐1112 | B | C | D | E |
|---|---|---|---|---|---|
| 1 | AA |   |   |   |   |
| 2 | BB |   |   |   |   |
| 3 |   |   |   |   |   |
| 4 |   |   |   |   |   |
| 5 |   |   |   |   |   |
| 6 |   |   |   |   | 1114 |

1120

|   | A | B | C | D | E |
|---|---|---|---|---|---|
| 1 | AA<br>1122a |   |   |   |   |
| 2 | BB<br>1122b |   | AA<br>1124a | AA<br>1124e | AA<br>1124i |
| 3 |   |   | BB<br>1124b | BB<br>1124f | BB<br>1124k |
| 4 |   |   | AA<br>1124c | AA<br>1124g | AA<br>1124l |
| 5 |   |   | BB<br>1124d | BB<br>1124h | BB<br>1124m |
| 6 |   |   |   |   |   |

FIG. 11

EFFICIENT COPY PASTE IN A COLLABORATIVE SPREADSHEET

FIELD OF THE INVENTION

In general, this disclosure relates to performing copy-paste operations in a collaborative spreadsheet.

BACKGROUND

Spreadsheets are useful for manipulating structured arrays of data. In particular, spreadsheets can rapidly perform many repetitive calculations on such arrays of data. Collaborative spreadsheets are useful for allowing multiple users to edit a document simultaneously on multiple devices in communication via a network. In collaborative spreadsheets, multiple users can edit the same portion of a spreadsheet at the same time. This situation may give rise to an edit made by one user conflicting with or intersecting an edit made by another user. One way to resolve this is for each device to transmit the data resulting from each edit over the network to the other devices and servers via the network. However, this can result in the transfer of large volumes of data across the network, especially for copy-paste operations.

SUMMARY

Accordingly, systems and methods are described herein for resolving intersecting edits in a collaborative spreadsheet. In certain aspects, the systems and methods described herein relate to editing a collaborative spreadsheet hosted on a server. The collaborative spreadsheet is displayed using a processor and on a user device. The collaborative spreadsheet may be displayed based on a first model stored on the user device. A first input may be received at the processor and from a user. The first input may include a source range of the spreadsheet, a destination range of the spreadsheet, and an instruction to copy content from the source range to the destination range. A second input may be received at the processor and from the server. The second input may include an input to modify a portion of the spreadsheet. The second input may include an instruction to modify the spreadsheet in a manner that affects content in at least one of the source range and the destination range. The first input may be transformed at the processor. The first input may be transformed based on the second input to obtain a transformed first input. The model may be modified using the processor. The first model may be modified based on the second input to obtain a second model. The second model may be further modified using the processor. The second model may be modified based on the transformed first input to obtain a third model. The collaborative spreadsheet may be displayed using the processor and at the user device. The collaborative spreadsheet may be displayed based on the third model.

The first input and a first revision number corresponding to the first model stored on the user device may be transmitted to the server. Determining whether to transform the first input may be based on whether an acknowledgement is received from the server. The acknowledgement may be associated with the first input and may include a second revision number that is greater than the first revision number. Whether the acknowledgement is received may determine whether to further modify the second model. The transformed first input and a revision number corresponding to the second model stored on the user device may be transmitted to the server. The destination range may be larger than the source range. The instruction to copy content may include an instruction to tile content from the source range into the destination range.

In some aspects a first input to modify the spreadsheet may be received at the server from a first user device. A second input may be received at the server from a second user device. The second input may include a source range of the spreadsheet, a destination range of the spreadsheet, and an instruction to copy content from the source range to the destination range. The first input may include an instruction to modify the spreadsheet in a manner that affects at least one of the source range and the destination range. The second input may be transformed based on the first input to obtain a transformed second input. The transformed second input may be transmitted from the server to the first user device.

Determining whether to transform the second input may be based on a comparison of a first revision number associated with the first input with a second revision number associated with the second input. A model of the spreadsheet stored on the server may be modified based on the first input to obtain a first modified model. The first modified model may be further modified based on the transformed second input to obtain a second modified model.

An acknowledgement of the first input and a first revision number may be transmitted from the server to the first user device. The first input and the first revision number may be transmitted from the server to the second user device. The transformed second input and a second revision number that is greater than the first revision number may be transmitted from the server to the first user device. An acknowledgement of the second input and the second revision number may be transmitted from the server to the second user device.

BRIEF DESCRIPTION OF THE DRAWINGS

FIG. 7 is an illustration of a row insertion change intersecting a copy-paste change, according to an illustrative implementation;

FIG. 8 is an illustration of a row deletion change intersecting a copy-paste change, according to an illustrative implementation;

FIG. 9 is an illustration of a set-cell change intersecting a source range of a copy-paste change, according to an illustrative implementation;

FIG. 10 is an illustration of a set-cell change intersecting a destination range of a copy-paste change, according to an illustrative implementation;

FIG. 11 is an illustration of a tiled copy-paste operation, according to an illustrative implementation.

DETAILED DESCRIPTION

Figure 1:
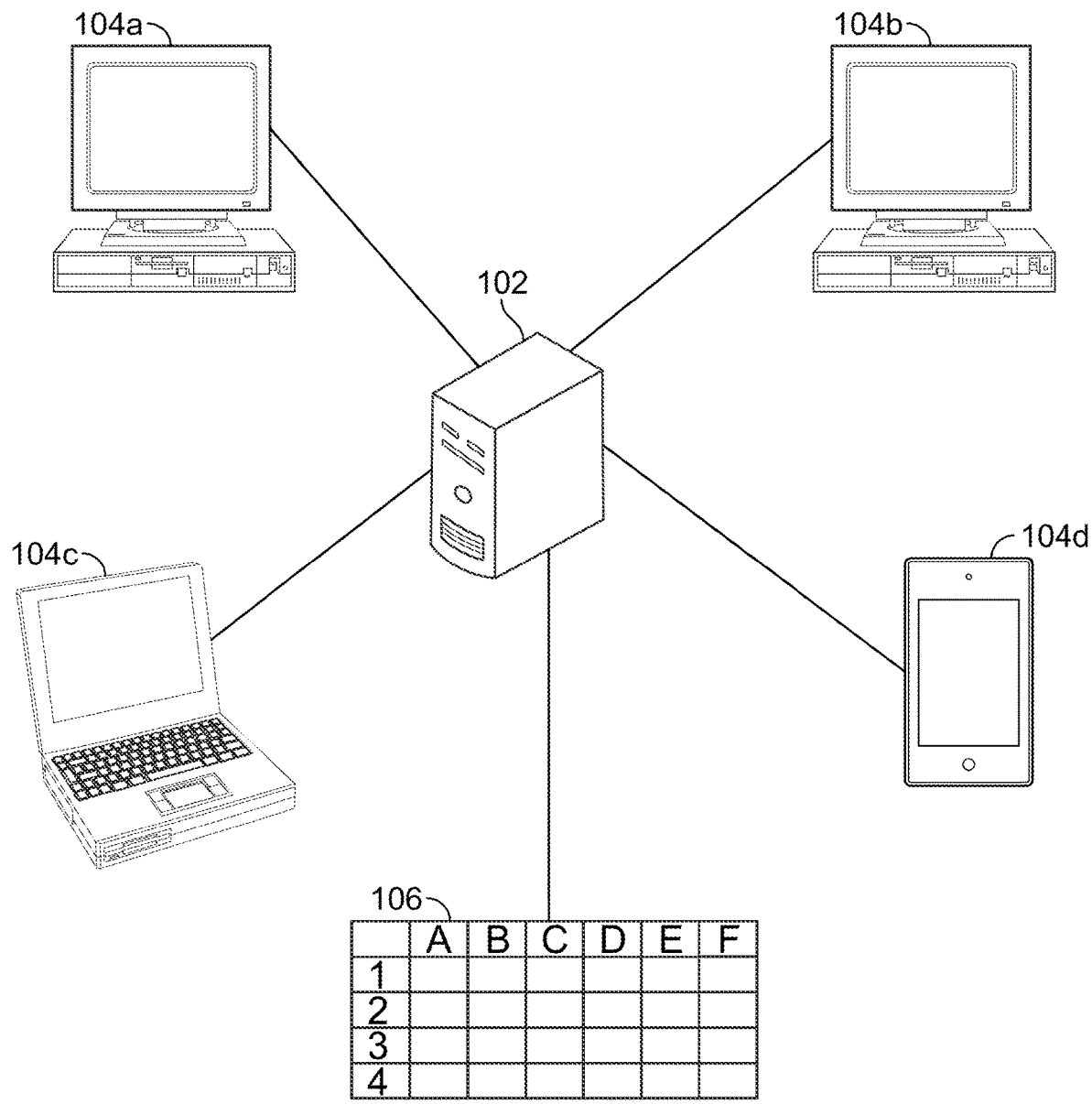
FIG. 1 is a block diagram of a cloud computing service, according to an illustrative implementation.

To provide an overall understanding of the disclosure, certain illustrative embodiments will now be described, including a system and method for efficiently performing copy-paste operations in a collaborative spreadsheet. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more components, which include a processing device or devices, such as a computer, microprocessor, logic device or other device or processor that is configured with hardware, firmware, and software to carry out one or more of the computerized methods described herein.

As used herein, a spreadsheet is an electronic document having data contained in cells. The cells are arranged in an array, typically a rectangular array. Each cell can be identified by one or more indices. In a rectangular array, these indices can be row and column indices. Often, in a spreadsheet user interface, row indices are denoted by Arabic numerals, and column indices are denoted by letters of the English alphabet. While this is a common implementation, other implementations, such as using pairs of numerals or pairs of letters, are possible. Other numeral systems, such as the Roman system, and other alphabets, such as the Greek alphabet, may be used. Software that implements the spreadsheet may store the indices in a different format than is displayed in the user interface. For example, while a cell may have the user interface indices of "B4," the software may internally store the cell's indices as the ordered row-column pair (4,2), denoting the fourth row and second column.

In the user interface, the data contained in each cell may be in the form of a number, a text string, a formula, or a combination thereof. The software may store all data in the form of a text string, an integer, a floating-point number, or a combination thereof. If the cell B4 of the spreadsheet contains the text string "Hello World" (where the string does not include quotation marks), the character "W" may be referenced by the set of indices (4,2,7), indicating that the character is the seventh character in the string contained in the cell in the fourth row and second column of the spreadsheet.

Other representations and ordering of indices are possible. For example, a set of indices may be numbered starting at 0 instead of 1, or the position within the cell may be located before the row and column indices. In some examples, integers and floating-point numbers are only referenced by row and column indices and are not referenced by a position within a cell. Dissimilar types of data may be contained within a single spreadsheet, such that one cell of the spreadsheet contains a text string, one cell of the spreadsheet contains an integer, and another cell of the spreadsheet contains a floating-point number. A formula may be stored as a text string and processed according to special rules. For example, the formula "=A2+B2," when entered into the cell B4, instructs the application to display in the cell B4 the sum of the contents of the cells A2 and B2.

As used herein, a copy-paste operation in a spreadsheet is an operation initiated by a user which duplicates data from one or more cells in a source range to one or more cells in a destination range. The operation may be a literal duplication, and the cells in the destination range may, after the operation, contain the same contents as the corresponding cells in the source range. A formula that is copied and pasted may include absolute or relative references, as described in more detail with respect to FIG. 6. A copy-paste operation may include tiling, as described in more detail with respect to FIG. 11. In a tiled copy-paste operation, the sizes of the source and destination ranges are not the same.

Collaborative spreadsheets may be edited by multiple users of a cloud-based document storage system. Problems may arise when multiple users edit the same portion of the spreadsheet. When this happens, the ranges of cells being edited may intersect, causing potential ambiguity as to which cells are referenced by each of the edits. In particular, a copy-paste change made at one device may be intersected by another change made at another device. For example, a row may be inserted at a location that intersects a destination range of a copy-paste operation. When this happens, changes to cell indices can create potential ambiguity as to which cells should receive the pasted data.

Operational transforms, implemented in conjunction with collaboration logic, can resolve this potential ambiguity. In this way, each device can transform the copy-paste change by the intersecting change, such that the copy-paste change operates on an adjusted range of cells. Implementing this can create large amounts of network traffic between the devices if not handled efficiently. For example, each device, as part of sending a paste command, may send all of the data to be pasted to other devices on the network. While simpler to implement, if the paste destination range is large, this can result in an unwieldy volume of network traffic. In some implementations, however, this traffic can be greatly minimized by sending only the copy-paste instructions, which may include indices of cells in the source and destination ranges. Each device and the server can then perform operational transforms on the copy-paste instructions according to the collaboration logic.

Performing copy-paste operations in this way is useful because a reduced amount of data is transferred over a network as compared to less efficient copy-paste operations. Large amounts of data transfer can render a collaborative spreadsheet effectively unusable by slowing down a device's applications and network connections. By efficiently performing operational transforms on copy-paste operations, the benefits of complex spreadsheet operations can be realized while also realizing the benefits of collaborative documents.

FIG. 1 shows a client-server system 100 that includes a cloud computing service 102 and a number of client devices 104a-104d (generally, client device 104). The cloud computing service 102 provides cloud computing services for a set of client devices 104. In particular, the cloud computing service 102 may include one or more servers that store a number of files accessible by the client devices 104a-104d, such as an exemplary collaborative spreadsheet 106. Users at the client devices 104 may create, edit, copy, share, and delete files stored on the cloud computing service 102. For example, the client devices 104 may each use a web browser to simultaneously access the spreadsheet 106 on the cloud computing service 102. The cloud computing service 102 provides each client device 104 with a local copy of the spreadsheet 106, which users on the client devices 104 may then view and edit. The cloud computing service 102 may synchronize the local copies of the spreadsheet 106 with one another and with a copy of the spreadsheet 106 that is stored on a server in the cloud computing service 102. In one example, edits, which may be referred to herein as changes, that are made by the client device 104a are automatically sent to the cloud computing service 102 and transmitted to the other client devices 104b, 104c, and 104d. In this manner, changes made by one collaborator may be immediately seen by other collaborators.

As used herein, a file includes a set of digitally encoded bits stored on a storage medium. A cloud file includes a file that is stored on a server and accessible via a network. A local file includes a file stored on a user's local device. A client device includes a local device that communicates with a server in a client-server relationship. As used herein, a client device is synonymous with a user device and a local device, unless indicated otherwise by context. As used herein, a document can be associated with multiple files. For example, a cloud file may be a copy of a document stored on a server, and a local file may be a copy of the same document stored on a local device. Generally, multiple copies of the same document may be identical, but they may differ if changes made by one collaborator have not yet been transmitted to other collaborators. This situation may occur when the network connection is slow or intermittent. Multiple copies of the same document may also differ slightly if the copies are stored on disparate types of devices, such as devices with different operating systems. In this case, different copies may have slightly different metadata, or may be encoded differently. For example, one copy may be encoded in a big-endian format, and another copy may be encoded in a little-endian format. These format differences can exist across multiple files that are copies of the same document, as long as the substance of the information that is displayed to the user is the same across the copies. A local device may read the contents of a file (stored in non-volatile memory) and store a model representing the file in working memory. The working memory may be volatile (e.g. RAM or an equivalent).

The client devices 104 may include any combination of desktop computers, laptop computers, tablets, smart phones, mobile electronic devices, or any other device that may connect to the cloud computing service 102 through a network. Only four client devices 104 are shown in system 100, but it should be understood that any number of client devices 104 of any type may be configured to communicate with the cloud computing service 102. The cloud computing service 102 and the client devices 104 of the system 100 may be connected through a remote network, such as the Internet. The network connection may be facilitated through a local area network, wide area network, Ethernet, fiber optic network, wireless network, cellular network, interactive television network, telephone network, wireless data transmission system, two-way cable system, customized private or public computer network, interactive kiosk network, direct link, satellite network, and or any other wired or wireless connection.

Figure 2:
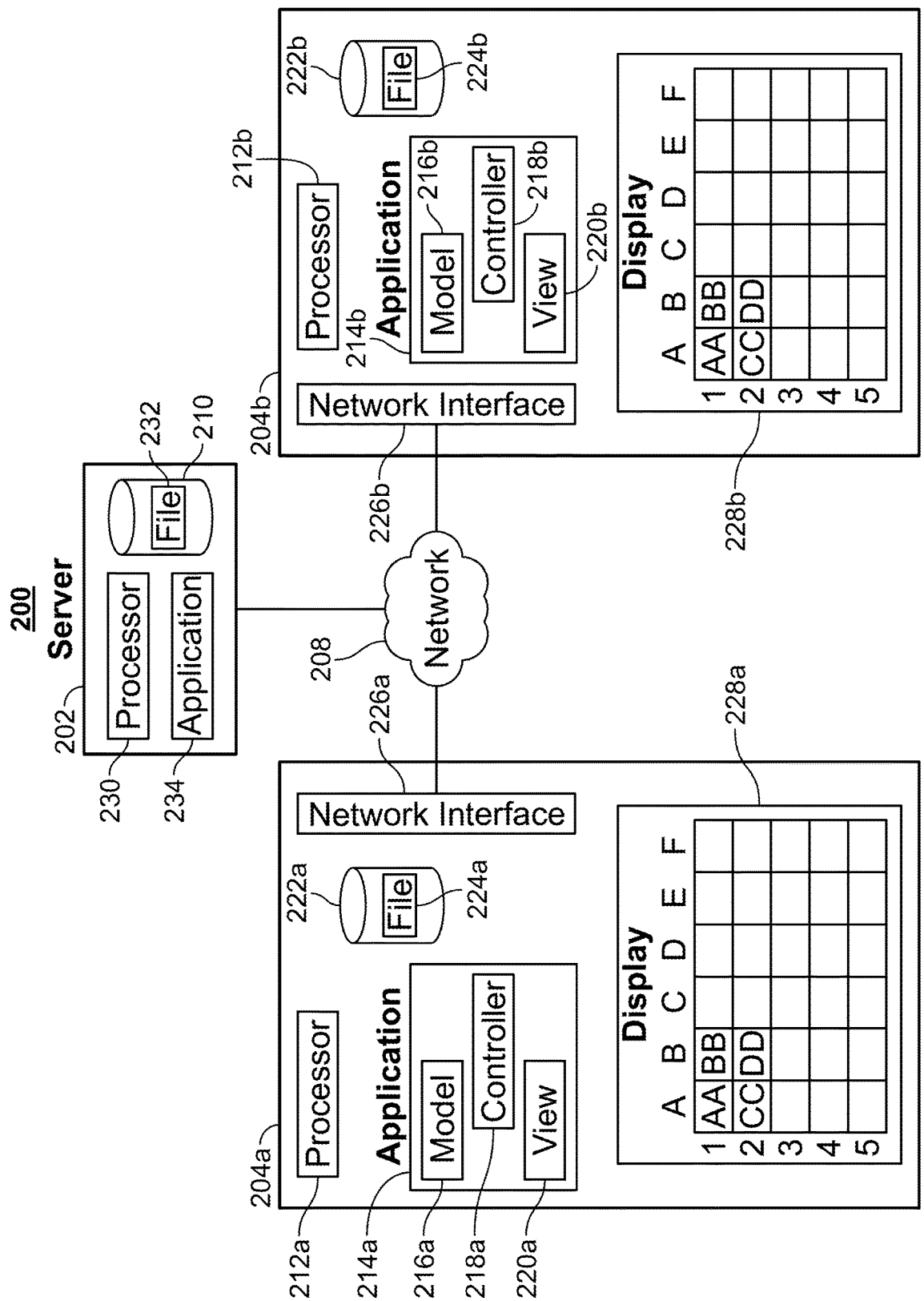
FIG. 2 is a block diagram of two client devices in communication with a server, according to an illustrative implementation.

FIG. 2 shows in more detail a client-server system 200 which may be used to implement efficient copy-paste operations on a collaborative spreadsheet. The system 200 includes a server 202 and two client devices 204a and 204b connected over a network 208. As shown in FIG. 2, the client devices 204a and 204b are identical and have the same components. The parts described in relation to the client device 204a are applicable to the client device 204b. As depicted, the system 200 includes one server and two client devices, but in general, the system 200 may include more than one server and any number of client devices. The client device 204a includes a processor 212a, a database 222a storing a file 224a, a network interface 226a, a display 228a, and an application 214a.

The application 214a is configured to display, render and edit documents using a model-view-controller paradigm. The application 214a contains a model component 216a, a controller component 218a, and a view component 220a. The model component 216a is a representation of the document and is typically of a hierarchical nature. The view component 220a is configured to interpret and render for display the model component 216a. The controller component 218a is configured to receive input, either from a user or from another source such as a network source, and update the model. The model component 216a, when it has been updated, may notify the view component 220a and the controller component 218a that an update has occurred. In some examples, the model component 216a is passive, and does not provide such updates. In these examples, the view component 220a and the controller component 218a will poll the model component 216a for updates. The model 216a may be a hierarchical model such as a document model (DOM). In a DOM, data is arranged in nodes in a hierarchical manner such that each node has a parent node and/or one or more child nodes. A node may represent a document, a paragraph, a sentence, a word, or a letter, and a node may also include formatting for portions of the document. When the document is a spreadsheet, a node may also contain cells of a spreadsheet, or text strings indicating parts of contents of a cell.

The depiction of the application 214a in FIG. 2 is illustrative, and one or more components of the application 214a may reside on other parts of the client device 204a. For example, some or all of the model component 216a may be stored in the database 222a, such as within the file 224a. Furthermore, code for the application 214a may be stored on the database 222a and executed by the processor 212a. In the example shown in FIG. 2, the view component 220a of the application 214a is rendering a spreadsheet document on the display 228a. Based on the rendering, the processor is displaying the collaborative spreadsheet based on the model 216a stored on the user device 204a. As is shown in FIG. 2, the application 214a resides on the client device 204a. In some examples, part or all of the application 214a may reside on the server 202. In some examples, the application 214a may be implemented in a thin-client environment, in which most of the code for the application 214a resides on the server. In some examples, code for the application 214a may be delivered on-demand from the server 202 to the local device 204a via the network 208.

The network interface 226a may include hardware and/or software configured to communicate with a network 208. The code for the network interface 226a may be run by the processor 212a, or alternatively, may be implemented on hardware contained in the network interface 226a itself. The network 208 may be a network such as the Internet, the World Wide Web, a local area network, a wide area network, a cellular network, or other similar network as described herein. The client device 204a may also include one or more user input devices, such as a mouse or other pointing device, and a keyboard. The client device 204b includes similar components and features as the client device 204a.

The server 202 includes a processor 230, an application 234, and a database 210 containing a file 232. In some examples, the server 202 may implement a cloud computing service, such as the service 102 depicted in FIG. 1. As depicted in FIG. 2, the database 220 stores a file 232, but in general may store any number of files. Some or all of these files may be made available to users of the cloud computing service. The processor 230 runs applications stored on the server 202, such as the application 234. Code for the application 234 may also be stored in the database 210. The application 234 may be part of the cloud computing service. As part of the cloud computing service, the application 234 may contain collaboration logic that coordinates edits made to documents stored on the cloud computing service. When implementing the collaboration logic, the application 234 may maintain a list of changes to a document stored on the cloud computing service, and may maintain a master model of the document. To further implement the collaboration logic, the application 234 may receive edits made by, for example, the user of the device 204a and may send those edits to other users of the collaborative document service, such as a user of the device 204b. In this manner, the application 234 coordinates edits made by multiple users such that multiple users may view renderings of document models that are similar or substantially the same. In the example depicted in FIG. 2, the users of the devices 204a and 204b are both viewing the same version of a collaborative spreadsheet. Changes made by the user of the device 204a may be sent, through the network 208 and the server 202, to the device 204b for display on the display 228b. This would cause the model 216b to be updated with the change made by the user of the device 204a. By communicating with the server 202 via the network 208, the devices 204a and 204b are able to display similar or substantially the same version of the collaborative spreadsheet. In some examples, a client device may perform one or more functions described herein as being performed by a server. In these examples, a server may have no role or only an incidental role.

FIGS. 3A, 3B, 3C, and 3D depict a swim lane diagram showing how changes made by two users (i.e., Alice and Bob) are coordinated via a server using collaboration logic. FIGS. 3A-3D depict three lanes 301, 303, and 305, each containing events or states of a machine. The first lane 301 includes states 302, 312, 324, 338, and 348 and events 308 and 334, each of which occurs at a device operated by a user named Alice. The second lane 303 includes states 304, 318, 326, 328, and 344 and event 340, each of which occurs at a server. The third lane 305 includes states 306, 314, 320, 336, and 352 and events 310 and 350, each of which occurs at a device operated by a user named Bob. FIGS. 3A-3D also depict messages 316, 322, 332, and 346 and acknowledgements 330 and 342, each of which is transmitted from one device (or server) and received at another device (or server). Alice's device, Bob's device, and the server may correspond to the client device 204a, the client device 204b, and the server 202, respectively, shown in FIG. 2. With respect to FIGS. 3-11, the terms "client device," "server," "Alice," and "Bob" are intended to refer to the respective machines, but also to include applications running thereon and their components such as processors. Therefore, the use of language herein describing, for example, a machine taking an action may be a concise description of a processor of the machine running an application and taking the action. Unless otherwise indicated by context, the term "device," as used herein, can include a server or other computing system.

In FIGS. 3A-3D, each of the lanes 301, 303, and 305 contains its own vertically-oriented time axis, with earlier-occurring events or states shown above later-occurring events or states. For example, as is shown in the lane 301, the state 302 occurs before the event 308. Each lane provides an indication of relative timing of events within that lane. Relative timing of events or states occurring in different lanes can be inferred from FIGS. 3A-3D through messages or acknowledgements that cross between two lanes, such as a message sent from one device to another. For example, it cannot be inferred purely from the diagram whether the event 308 in the lane 301 happens before, at the same time, or after the event 310 in the lane 305. However, the fact that the event 308 occurs after the state 302 and before the state 312 can be inferred purely from the diagram, since the event 308 and the states 302 and 312 are part of the lane 301. The same is true for the lanes 303 and 305, and for events and states within those lanes.

Client states shown in this figure, such as the state 302, show a snapshot of the current state of the client device and include sent changes, pending changes, and the state of the current document model on a client device. Alice's client state 302 contains no sent changes and no pending changes. The state 302 includes a document model 307 reflecting a spreadsheet, four cells of which contain data. Cell A1 contains the text string "AA," cell B1 contains the text string "BB," cell A2 contains the text string "CC," and cell B2 contains the text string "DD." Each state also shows the last synced revision number of that state. The last synced revision number of the state 302 is 0, which indicates that revision number 0 was the last revision number of the document that was synchronized between Alice's device and the server prior to state 302. Bob's client state 306 is Bob's beginning state and is identical to Alice's client state 302. Bob's state 306 includes a document model 311. Bob's current document model 311 is the same as Alice's current document model 307.

Server states, such as the server state 304, show a snapshot of the current state of the server and includes a revision log for the document, a list of pending changes, and a current model of the document. The state 304 includes a document model 309, which is the same as the current document model 307 of Alice. In some examples, the server does not maintain a current document model, but only maintains the list of pending changes and the revision log. In these examples, the state of the current document model can be obtained by applying all entries in the revision log to a blank spreadsheet.

FIGS. 3A-3D depict a situation in which Alice and Bob perform intersecting editing operations on a collaborative spreadsheet hosted by the server. In FIGS. 3A-3D, Alice performs a copy-paste operation, but before her change is synchronized with the server, Bob inserts a row that intersects the copy-paste range of Alice's change. These intersecting changes are reconciled using operational transforms and collaborative logic.

Figure 3A:
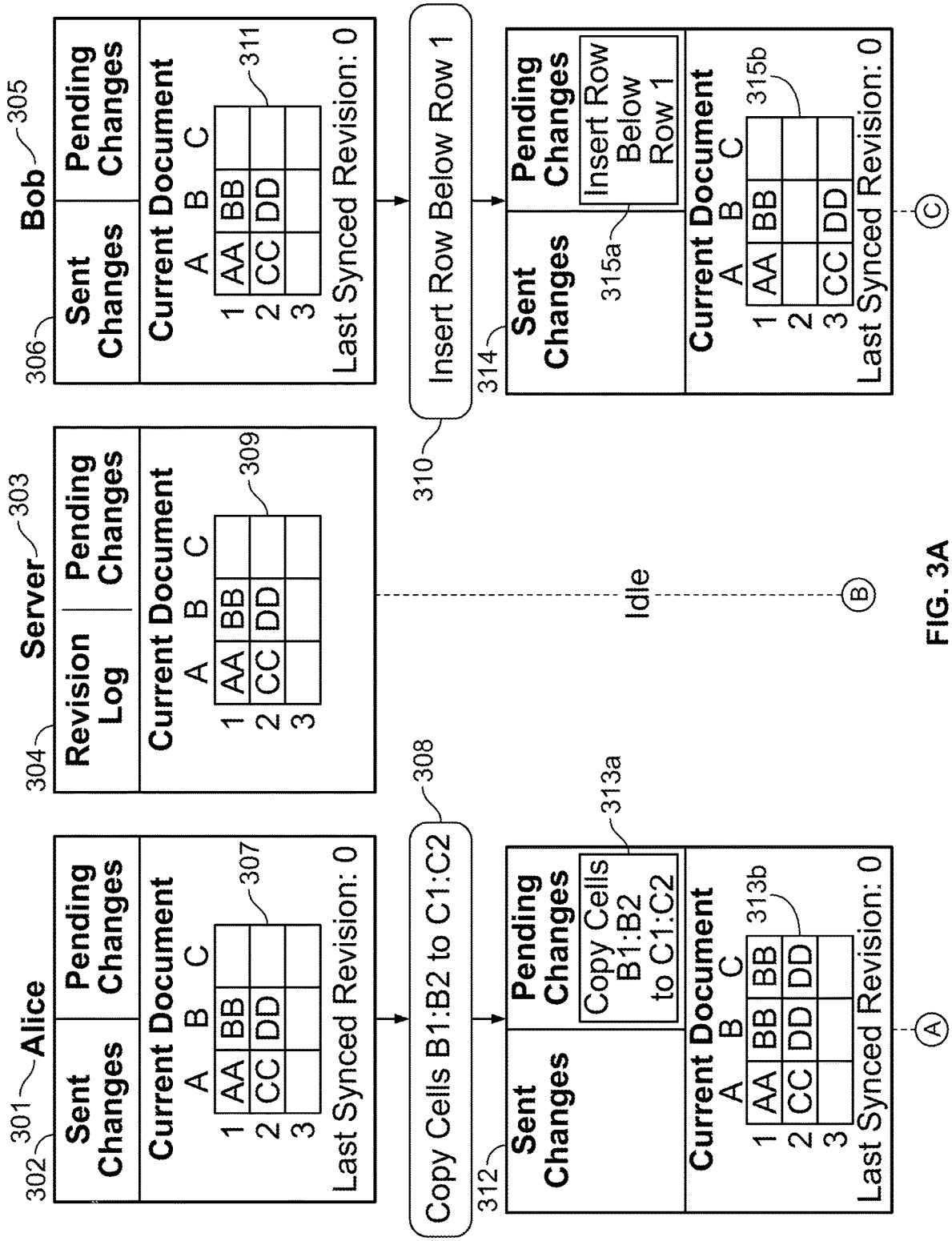
FIGS. 3A, 3B, 3C, and 3D depict a swim lane diagram showing edits made to a collaborative document using two client devices in communication with a server, according to an illustrative implementation.

Beginning at FIG. 3A, Alice, the server, and Bob all start out with the same model of the collaborative document, as shown in the states 302, 304, and 306, respectively. Furthermore, Alice, the server, and Bob all start at revision number 0. At the event 308, Alice copies the contents of the cells in the range B1:B2 to C1:C2. As a result of event 308, Alice's device is in the state 312, which includes a pending change 313a and a document model 313b. The pending change 313a corresponds to the change made at the event 308. Since the change received at the event 308 has not been modified, the ranges of the cells in the pending change 313a are the same as the ranges of the cells in the event 308. Alice's current document model 313b is updated to reflect the result of Alice's copy-paste operation. The contents of cells C1:C2 are now identical to the contents of cells B1:B2.

Alice's last synced revision number in state 312 is still 0, because Alice's pending change has not yet been synchronized with the server.

Before the change to the document resulting from Alice's copy-paste event 308 was synchronized with the server, Bob makes a change as shown in the event 310. In the event 310, Bob provides an input to insert a row in the collaborative spreadsheet between rows 1 and 2. As a result of the event 310, Bob's device is in the state 314, which has no sent changes, a pending change 315a, and a document model 315b. The pending change 315a corresponds to the change made at the event 310, with no modifications. The state 314 also includes a document model 315b, which has been updated to reflect Bob's change at the event 310. As shown in the document model 315b, a row has been inserted, and row 2 is now empty. The contents of the model 311's row 2 have been moved to row 3 in the model 315b. In the state 314, Bob's last synced revision number is still 0, because Bob's pending change has not yet been synchronized with the server.

Figure 3B:
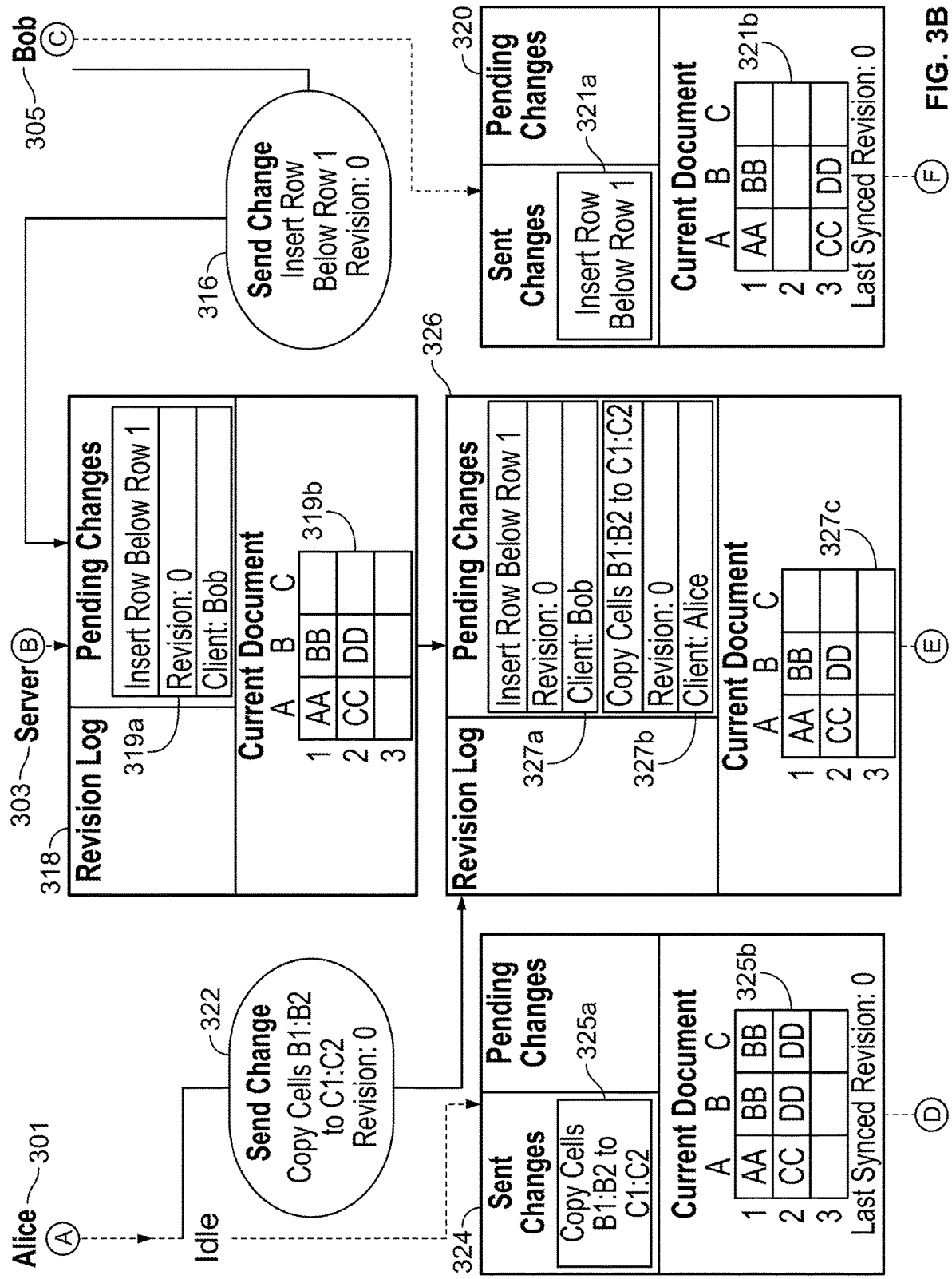

Turning to FIG. 3B, the message 316 depicts Bob's device sending Bob's pending change of the state 314 to the server. In this example, Bob's change from the event 310 is sent to the server before Alice's change from the event 308 is sent. Such a situation may result from a number of factors. For example, Bob may have made his change before Alice made her change. Alternatively, the changes could have occurred substantially at the same time, or Bob's change could have even occurred after Alice's change, but Alice's network connection may have been intermittent or very slow. Any of these situations may result in the server receiving Alice's change later than Bob's change. An intersection between Alice's change of the event 308 and Bob's change of the event 310 now arises, because Bob's insertion of a row below row 1 partitions the range of Alice's copy-paste operation. The message 316 contains the content of Bob's change (i.e., the command to insert a row below row 1) and a revision number. In some examples, each client will only send one change to the server at a time and will wait to receive an acknowledgment before sending another change. Such an acknowledgement communicates that the sent change has been applied at the server. The revision number sent in the message 316 is 0, indicating that Bob's last synced revision number was 0 and thus that the sent change in the message 316 corresponds to the spreadsheet in the state of revision number 0. However, in some implementations, this revision number may instead correspond to the revision number which Bob's device expects should result from the application of this change. In these implementations, this may be determined by incrementing the last synced revision number of Bob's device by 1. After sending the change in the message 316, Bob's device is in the state 320, which includes a sent change 321a and a document model 321b. The sent change 321a corresponds to the pending change 315a of the state 314. Bob's current document 321b is unchanged from the state 314. Furthermore, the last synced revision number of the state 320 is also unchanged from the state 314.

The server state 318 reflects the state of the server after receiving Bob's message 316. The state 318 contains no entries in the revision log, a pending change 319a, and a document model 319b. In the state 318, the pending change 319a corresponds to Bob's change in message 316. The change 319a contains instructions (i.e., insert one row below row 1), a revision number (i.e., 0) associated with the change, and an identifier of the client (Bob) who sent the change. Since the change 319a has not yet been committed to the revision log, the current document model 319b has not been changed from the model 309.

In the message 322, Alice's device sends Alice's copy-paste change of the event 308 to the server. The message 322 contains change instructions (i.e., copy cells B1:B2 to cells C1:C2) and a revision number (i.e., 0) associated with the change. After sending the change in the message 322, Alice's device is in the state 324, which includes a sent change 325a and a document model 325b. In the state 324, the pending change 313a of Alice's state 312 has been moved to the sent changes section and appears as the change 325a. Alice's current document model 325b is unchanged from the model 313b in the state 312. The last synced revision number (i.e., 0) of state 324 is also unchanged from the state 312.

After receiving Alice's change in the message 322, the server is then in the state 326. In the state 326, there are no entries in the revision log, two pending changes 327a and 327b, and a document model 327c. Since the pending change 327a was received before the pending change 327b was received, the pending change 327a appears first in the list. The pending change 327a is unchanged from the pending change 319a of the state 318. Since the pending change 327b was received second, it appears second in the list. The pending change 327b reflects the change received in the message 322 from Alice and includes Alice's copy-paste instructions, which are unchanged from the message 322. The change 327b also contains a revision number (i.e., 0) and the client originating the change (i.e., Alice). The state 326 also depicts the current document model 327c. Since no pending changes have been applied to the revision log, the model 327c is the same as the model 319b in state 318.

Figure 3C:
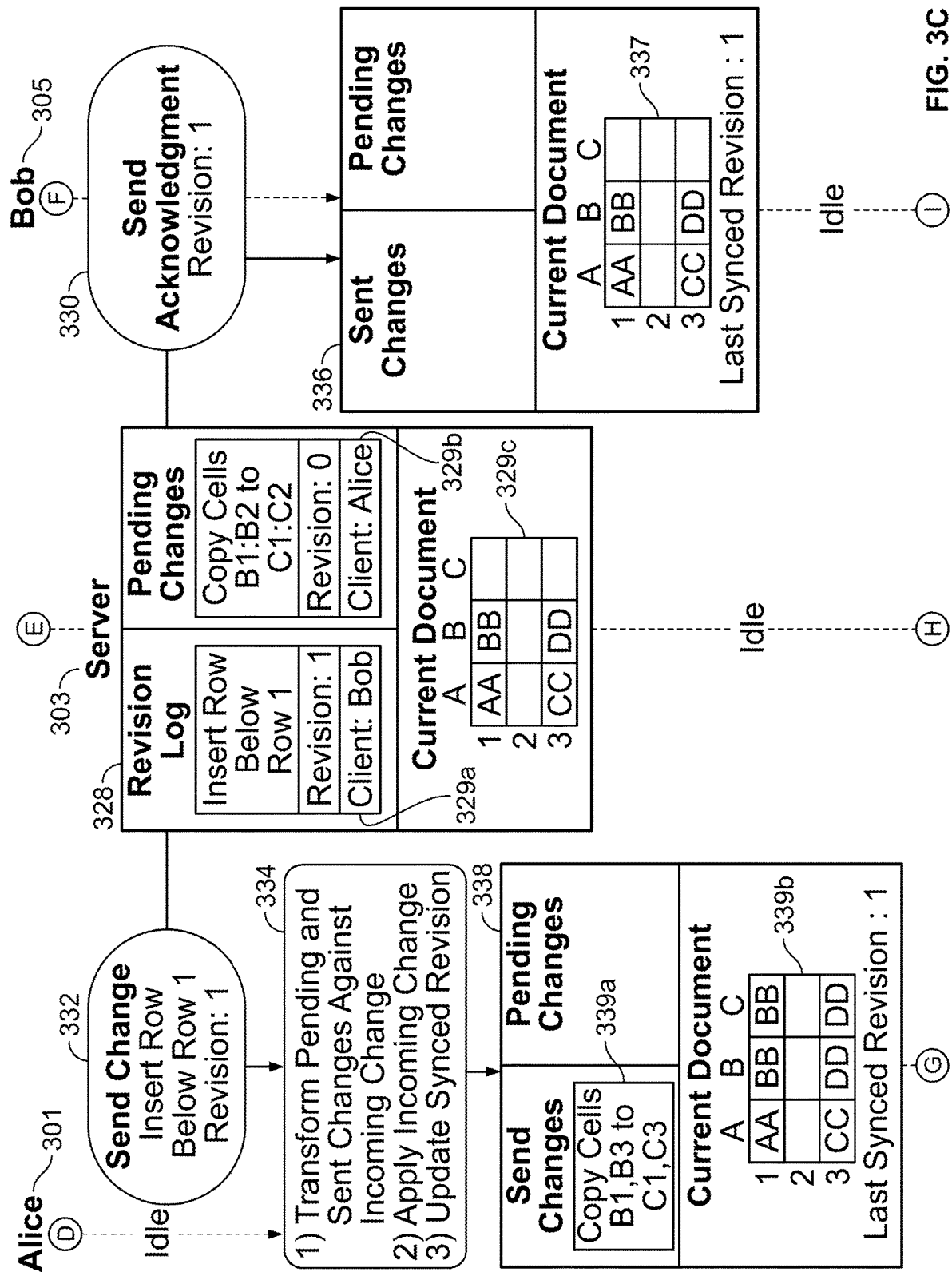

Turning now to FIG. 3C, the state 328 reflects the state of the server after applying its oldest pending change (i.e., the pending change 327a in the state 326). The state 328 includes a revision entry 329a, a pending change 329b, and a document model 329c. Bob's row insertion has been applied at the server and is reflected in the first entry 329a of the revision log. The entry 329a contains Bob's row insertion below row 1, and the revision number has been incremented to 1. The entry 329a also contains an identification of the client who originated the change (i.e., Bob). Furthermore, the current document model 329c has been updated to reflect the entry 329a. As part of the update, a row has been inserted below row 1, and the former contents of row 2 have been moved to row 3. In the updated model 329c, row 2 is an inserted empty row. The pending change 329b contains Alice's copy-paste operation and is the same as the pending change 327b of the state 326.

After applying Bob's change, the server sends the message 332 to Alice and the acknowledgement 330 to Bob. The message 332 contains the instructions of the applied change (i.e., insert one row below row 1), and an associated revision number (i.e., 1). The acknowledgement 330 sent to Bob is simply an acknowledgment that Bob's last sent change has been applied, and carries a revision number of 1. In some examples, since each client waits until receiving an acknowledgement before sending another change, there is no ambiguity regarding the change with which the acknowledgement is associated.

Bob's client state 336 shows the state of Bob's device after receiving the acknowledgement 330 and includes no sent changes, no pending changes, and a document model 337. Since Bob received the acknowledgement 330, Bob's change has been removed from the sent changes section of the state 336. In the state 336, Bob's current document model 337 is the same as the model 321b of the previous state 320, but the last synced revision number has been updated to match the revision number contained in the acknowledgement 330 (i.e., 1).

Alice's device, after receiving the message 332 from the server, performs the three steps shown in the event 334. First, Alice's device transforms all pending and sent changes against the incoming change received in the message 332. This operational transform can be performed using the method 600 of FIG. 6. In some examples, Alice's device may determine to transform the sent change 339a because an acknowledgement has not yet been received for it. In other examples, Alice's device may determine to transform the sent change 339a because the last synced revision number (i.e., 0) of the previous state 325 is lower than the revision number of the incoming change (i.e., 1). Second, Alice's device applies the incoming change in the message 332 to Alice's document model. Third, Alice's device updates its last synced revision number to match the revision number contained in the incoming message 332.

After Alice's device performs the operations of the event 334, Alice's device is in the state 338, which includes a transformed sent change 339a, no pending changes, and a document model 339b. The sent change 339a has been transformed against the change in the message 322 and is updated to operate on the ranges B1,B3 and C1,C3. Alice's current document model 339b has been updated to apply the change of the message 332. In the model 339b, the document reflects both Alice's original copy-paste operation and Bob's row insertion. Row 2 is blank, and the contents of former row 2 have been moved to row 3. Also in 339b, cells C1 and C3 match cells B1 and B3, respectively. By applying the operational transform at the event 334, the range of cells in Alice's sent change 339a has been split into 2 portions. Alice's transformed change 339a does not operate on cells in row 2 of the current document. Instead, Alice's transformed change only operates on cells in rows 1 and 3. The changes are transformed in this way to preserve the intent of Alice's change. At the time that Alice originated those changes, the inserted blank row 2 of the document 339b did not exist, and thus Alice could not have intended to modify that row. In Alice's state 338, the last synced revision number has been updated to 1 to match the revision number associated with the change received in the message 332.

Figure 3D:
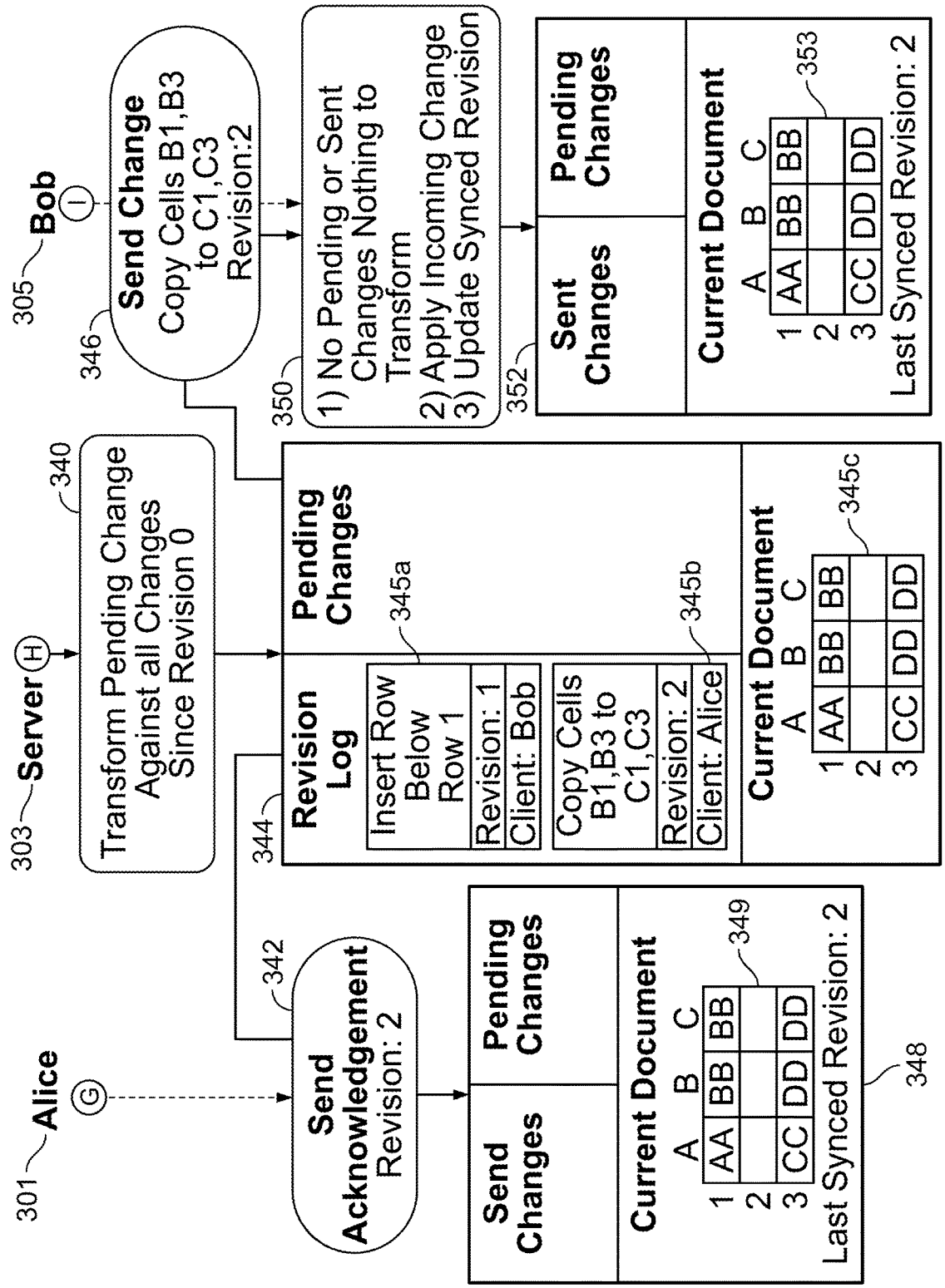

Turning now to FIG. 3D, at the event 340, the server transforms Alice's pending change against all changes in the revision log since revision number 0. The server may determine to transform Alice's pending change (i.e., the change 329b of the server state 328) because the revision number of the pending change is less than the revision number of the most recent revision entry (i.e., the revision number 1 in the entry 329a of the server state 328). Also at event 340, the server applies Alice's change to the revision log. The server transforms Alice's copy-paste operation using the same logic used by Alice's client at the event 334 and may be performed using the method 600 of FIG. 6. In both events 334 and 340, Alice's copy-paste operation was transformed against Bob's row insertion operation, and the source and destination ranges of Alice's copy-paste operation were split to accommodate Bob's inserted row. The changes resulting from the event 340 are reflected in the server state 344.

The server state 344 includes two revision entries, 345a and 345b, and a document model 345c. In the state 344, the first revision entry 345a remains unchanged from the revision entry 329a in the server state 328, and the revision entry 345b has been added to the revision log. The revision entry 345b reflects the oldest pending change of the previous state of the server (i.e., the pending change 329b of the server state 328). The revision entry 345b contains Alice's transformed copy-paste operation and its revision number of 2. The updated document model 345c shows the result of applying Alice's copy-paste operation to the previous version of the server document 329c, such that the contents of cells B1 and B3 have been copied to cells C1 and C3. Since the server and Alice's device used the same logic to transform Alice's copy-paste operation against Bob's row insertion operation, the server and Alice's device now have the same document model. After committing Alice's copy-paste operation to the revision log, the server sends an acknowledgment 342 to Alice, which is simply an acknowledgment that Alice's last change was committed to the revision log and carries a revision number of 2. Again, since in some examples, client devices do not send another change until receiving an acknowledgement from the server, there is no ambiguity regarding the change to which the acknowledgment corresponds.

Alice's final client state 348 includes a document model 349 and reflects the state of Alice's device after receiving the acknowledgment 342. In the final state 348, Alice's device has updated its last saved revision number to 2 to match the revision number received in the acknowledgment 342 and has removed the acknowledged change from the sent changes list.

Further, after committing Alice's copy-paste operation to the revision log, the server sends the message 346 to Bob. The message 346 includes Alice's transformed change, specifically, the transformed instructions of Alice's copy-paste operation and a revision number associated with that committed change. Upon receiving the message 346, Bob's device performs three steps at the event 350. First, since there are no pending or sent changes on Bob's changes, there is nothing to transform. If there were pending or sent changes on Bob's device, these changes would be transformed by the incoming change received in the message 346. This operational transform can be performed using the method 600 of FIG. 6. Second, Bob's device applies the incoming change in the message 346 to the document model. Third, Bob's device updates its last saved revision number to match the revision number received in the message 346.

Bob's final client state 352 includes a document model 353, no pending changes, and no sent changes and reflects the state of Bob's device after performing the operations of the event 350. In the final state 352, Bob's device has updated its document model to model 353, which contains the results of applying the incoming change in the message 346 to Bob's previous version of the document 337 of the previous client state 336. The contents of cells B1 and B3 have been copied to cells C1 and C3. Bob's last saved revision number has been updated to 2 to match the revision number contained in the message 346.

In the final states shown in FIG. 3D, Alice's copy-paste operation and Bob's row insertion operation have been propagated to all devices in the system, including the server. The document models 349, 345c and 353 all reflect the same state of the document. Furthermore, Alice's last saved revision number matches the revision number of the last change in the server revision log 345b, as well as Bob's last saved revision number. Importantly, these updates have been performed with a small amount of information sent across the system. Since the devices apply the same collaboration logic and operational transforms to reconcile intersecting changes, each device can optimistically apply its own incoming user changes and perform any necessary transforms of those user changes and incoming changes. The application of changes is termed "optimistic" because the client device optimistically assumes that it is working with the most recent version of the model. However, to mitigate possible complications resulting from a conflicting or intersecting change currently occurring on another device, the client device maintains its most recent change in a list of sent or pending changes until acknowledgement of the change is received from the server. Since all devices are using the same logic and transforms, it is not necessary to send substantially the same information across the server multiple times, for example, by sending both an original change and a transformed change. Only the original change is sent to the server, and an acknowledgement is received with a revision number. By comparing the revision number to an expected revision number, each device can perform transforms on an as-needed basis. The details of the methods followed by the client devices and the server to perform updates and operational transforms are explained with respect to FIGS. 4-6.

Figure 4:
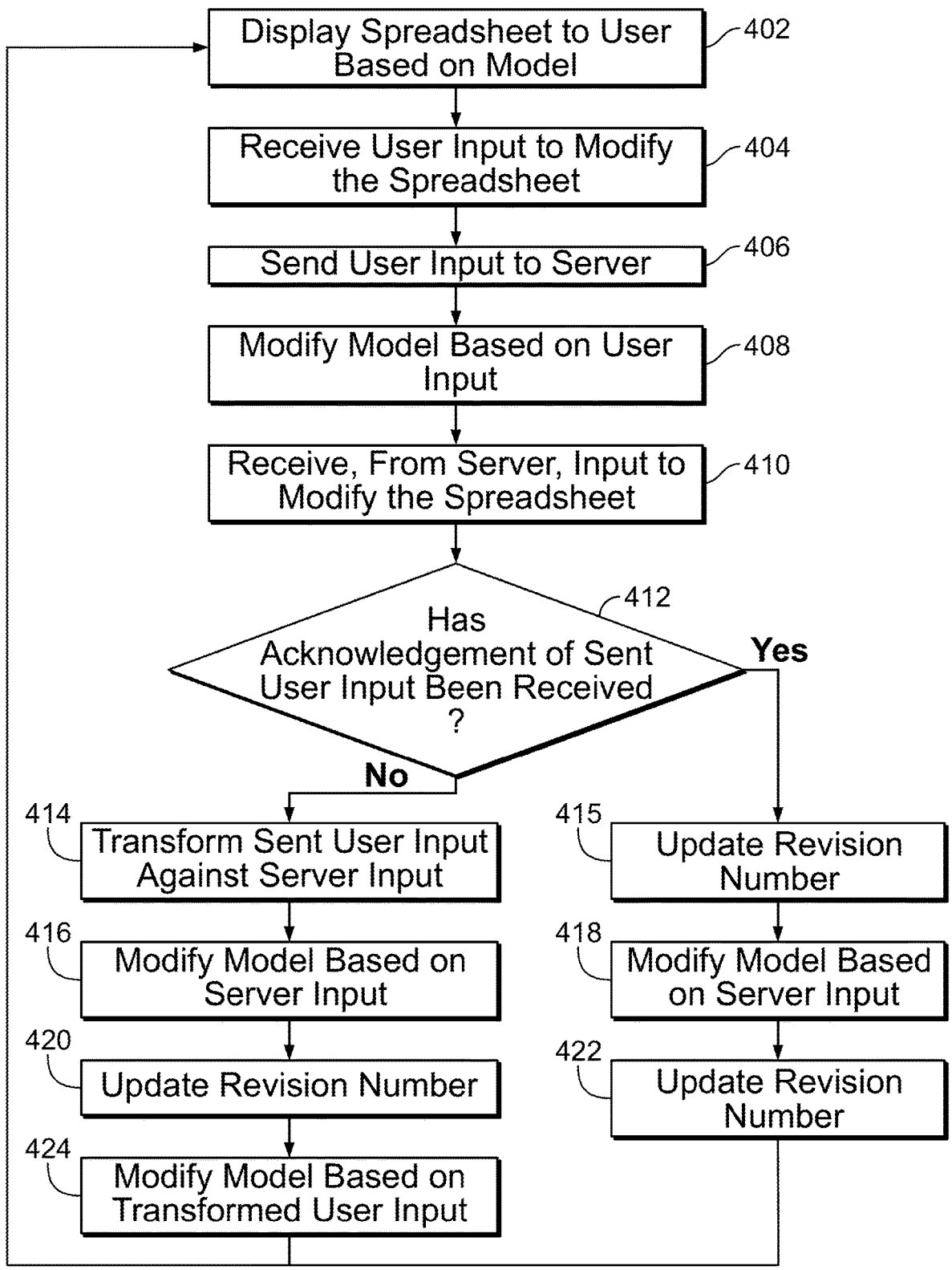
FIG. 4 is a flow chart of a method performed by a client device when reconciling user changes with changes received from a server, according to an illustrative implementation.

FIG. 4 is a flow chart of a method 400 implemented by a client device when transforming user changes against server changes. As used herein, a "user change" includes a change received by a local device from a user who interacts directly with the local device, and a "server change" includes a change received by a local device from a server. In an example, a server change may be initially provided by another user at a remote user device (that is remote from the local device) and transmitted to a server, which then transmits the change to the local device. Although the change may have originated from a user at a remote device, since the local device implementing the method 400 received the change from the server, the change is termed a server change. The method 400 may be performed at step 334 of FIG. 3C and 350 of FIG. 3D.

At step 402, the client device displays a spreadsheet to a user based on a model stored on the client device. At step 404, the device receives a user input to modify the spreadsheet. At step 406, the device sends the user input to the server. At step 408, the device optimistically modifies its model based on the received user input. In some examples, steps 406 and 408 can occur in the opposite order or substantially at the same time. At step 410, the client device receives an input from the server. The received input may include instructions to modify the spreadsheet.

At decision block 412, the client device determines whether the user input sent at step 406 has been acknowledged by the server. If acknowledgment has not been received, the method 400 proceeds to step 414, where the client device transforms the sent user input against the input received from the server and may use the method 600 of FIG. 6. Here, at step 414, if the server input intersected the user input, this conflict is resolved by the transform. If the two inputs did not intersect, then there was substantially no change effected by the transformation of step 414. At step 416, the user device modifies its last synced model based on the server input. Since an acknowledgement of the sent user input has not been received, the last synced model does not reflect this user input. At step 420, the user device updates its revision number to match the revision number received from the server at step 410. At step 424, the client device modifies the last synced model based on the transformed user input. While the client device optimistically modifies and displays the modified model based the transformed user input, since an acknowledgement has not yet been received, the last synced model still will not reflect the user input received at step 404.

Alternatively, if the client device determines that acknowledgment of the sent user input has been received from the server at decision block 412, the method proceeds to step 415. At step 415, since acknowledgement of the user input was received, the client device updates its revision number to match the revision number contained in the acknowledgement. At step 418, the client device modifies its model based on the input received from the server. At step 422, the client device updates the revision number to match the revision number contained in the input received from the server at step 410, and returns to step 402, to display the spreadsheet to the user based on the updated model.

Figure 5:
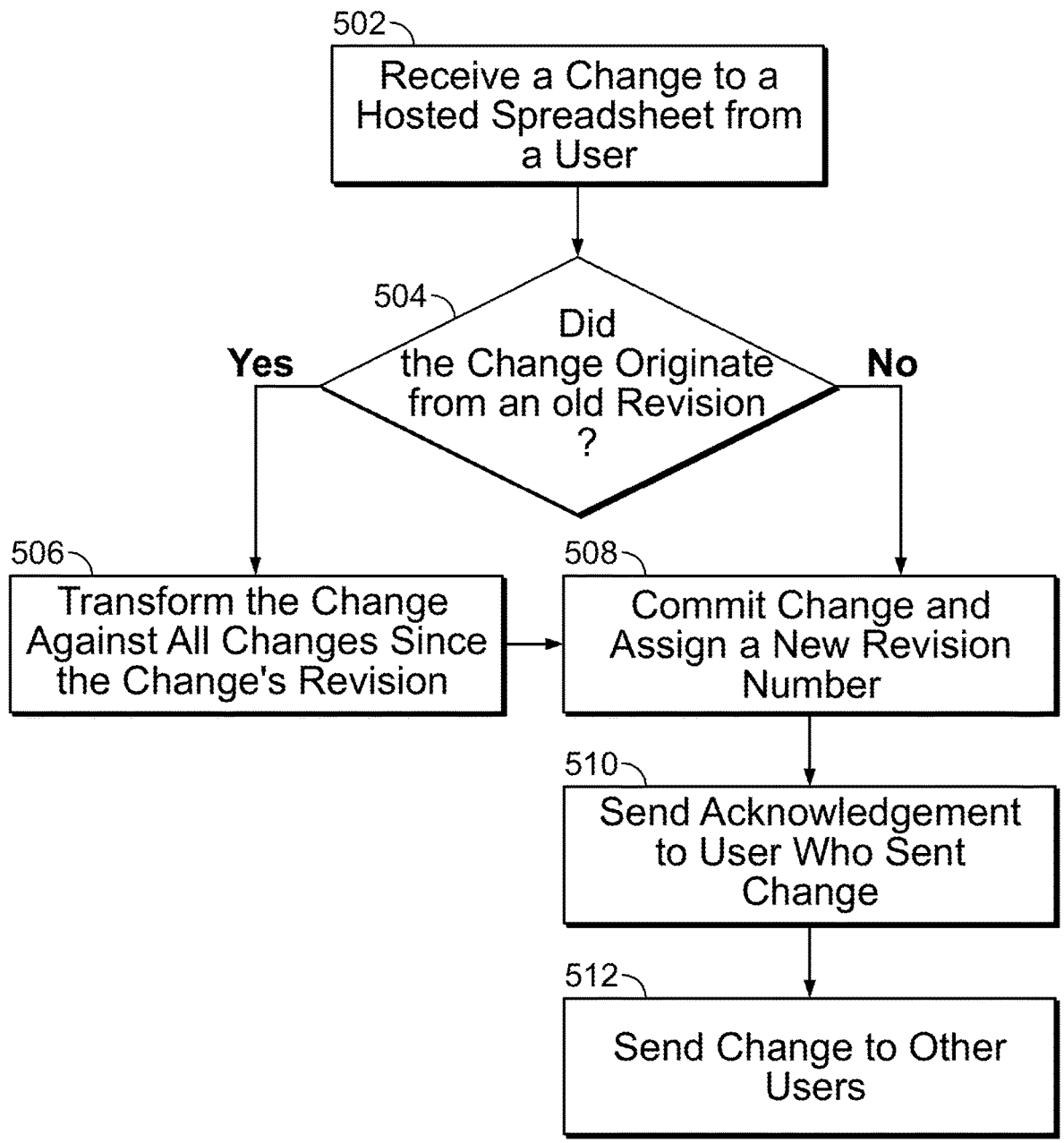
FIG. 5 is a flow chart of a method performed by a server when reconciling changes received from multiple client devices, according to an illustrative implementation.

FIG. 5 is a flowchart of a method 500 of transforming user inputs at a server based on inputs received from a client device. The method 500 may be performed at step 340 of FIG. 3D. At step 502, the server receives a change to a hosted spreadsheet. The change in step 502 is received from a user on a client device in communication with the server via a network. At decision block 504, the server determines if the change originated from an old revision. A change may originate from an old revision if the change was originally made to a revision of the spreadsheet that is older than the most recent revision of the spreadsheet committed to the revision log on the server. In some examples, the server may make this determination by comparing revision numbers. In these examples, the server compares the revision number associated with the received change and the revision number associated with the most recent committed entry in its revision log. If the revision number associated with the received change is a lower number than the revision number associated with the entry of the most recent committed change, then the server may determine that the change originated from an old revision. If the two revision numbers are the same, the server may determine that the change originated from a current revision.

If the server determines that the change originated from an old revision at decision block 504, the method proceeds to step 506. At step 506, the server transforms the change against all changes since the revision associated with the change's revision number and may implement the method 600 of FIG. 6. In this way, the server compensates for the effects of different devices having different revision numbers.

If, alternatively, the server determines that the change did not originate from an old revision at decision block 504, the method proceeds directly to step 508, at which the server commits the change to an entry in the revision log and assigns a new revision number to the entry. Committing the change at the server removes it from the server's log of pending changes and updates the server's model based on the change. At step 510, the server sends an acknowledgement to the user who sent the change. At step 512, the server sends the change to other users editing the collaborative document. The change sent in step 512 may either be the transformed change, if step 506 occurred, or it may be the change as received at step 502, depending on the outcome of decision block 504. In this way, the server transforms received user inputs based on the order the inputs were received. By transforming user inputs based on the order they were received, the server ensures that multiple devices can maintain similar models of the collaborative spreadsheet. Since all devices use the same collaboration logic and operational transforms as the server, similar models are maintained without excessive network traffic.

Figure 6:
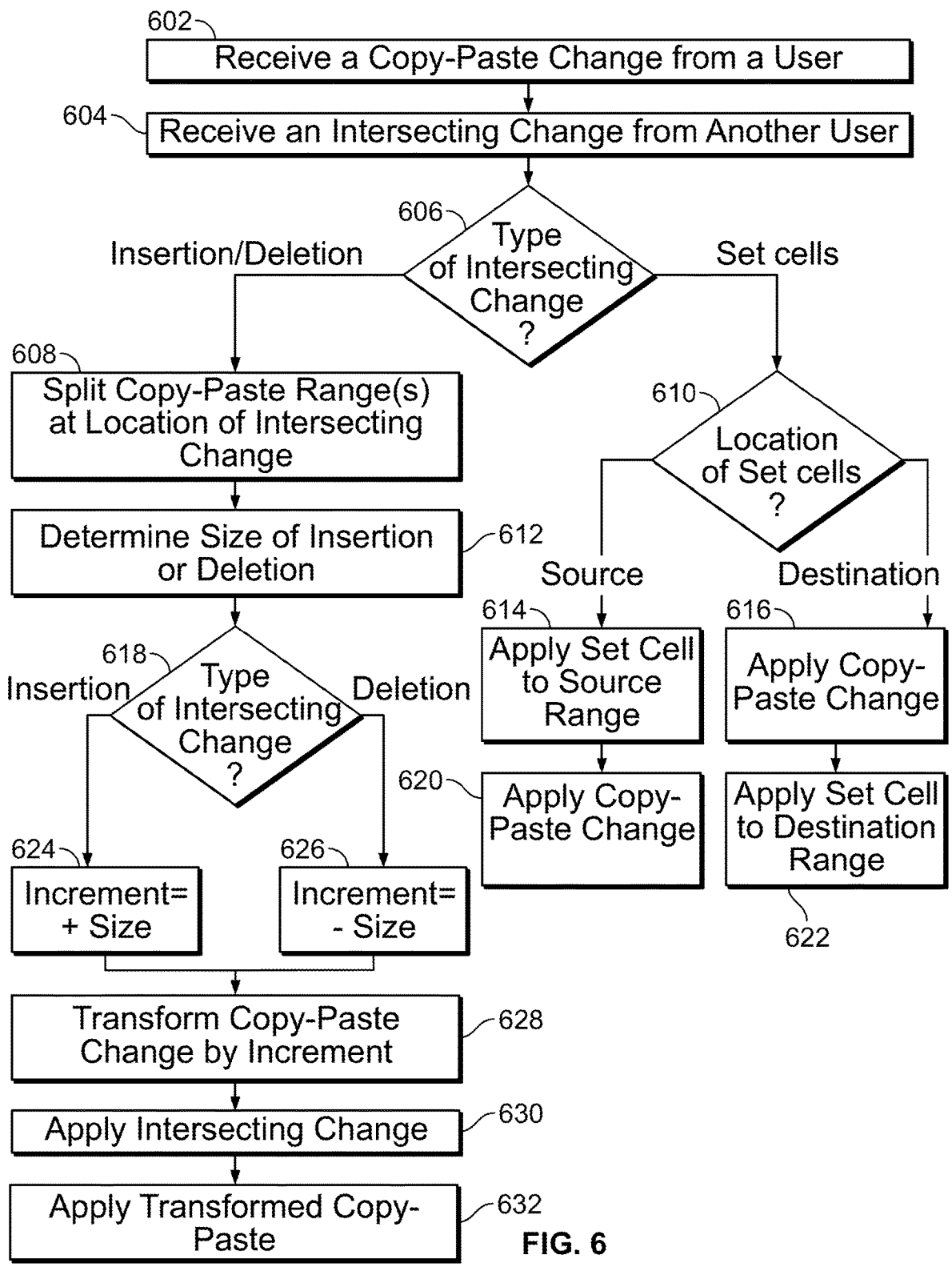
FIG. 6 is a flow chart of a method performed by a server or a client device when transforming one change against another, according to an illustrative implementation.

FIG. 6 is a flowchart of a method 600 of transforming a copy-paste change by an intersecting change. The intersecting change may affect either the source range or the destination range of the copy-paste change, or both ranges. The copy-paste change originates from a first user, and the intersecting change originates from a second user. In some examples, both changes originate from the same user but from different devices. These examples may occur if a user is simultaneously logged into a cloud computing system from different devices, such as a laptop and a tablet. In some examples, both changes originate from different users on the same device. Since the copy-paste change and the intersecting change may operate on intersecting ranges, a conflict between the two operations may exist. Operational transforms may be applied to one or more of the ranges to resolve this conflict such that the changes are applied to the collaborative spreadsheet in a manner according to the intent of each user. Operational transforms may be performed by either of the client devices, and by the server that is coordinating the changes. The method 600 may be used to perform operational transforms at any of events 334, 340, and 352 of FIG. 3, step 414 of FIG. 4, step 506 of FIG. 5, or any combination thereof.

At step 602, a copy-paste change is received from a user. This change may be received from a user input component of a device implementing the method 600, or the change may be received from another device on the network, such as a server or a user device. At step 604, an intersecting change is received from another user on the network. This change may be received from a user input component of the device implementing the method 600, or it may be received from another device on the network, such as a server or a user device. As previously discussed, intersecting changes may occur when multiple users edit the same portion of the spreadsheet. When this happens, the ranges of cells being edited may intersect, causing potential ambiguity as to which cells are referenced by each of the edits. In particular, a copy-paste change made at one device may be intersected by another change made at another device. For example, a row may be inserted at a location that intersects a destination range of a copy-paste operation.

At decision block 606, the type of intersecting change is determined. If the intersecting change is determined to be an insertion or deletion of rows or columns, the method proceeds to step 608, where one or more ranges associated with ranges of the copy-paste operation are split at the location of the intersecting change. The split range may be either the source range or the destination range of the copy-paste operation. In some examples, both the source and the destination range are split. Each split range is divided into two portions, to allow the indices of the affected portion or portions to be transformed. At step 612, the size of the insertion or deletion is determined, which may involve determining the number of rows or columns that are to be inserted or deleted.

At decision block 618, the device determines whether the intersecting change is an insertion or a deletion. If the intersecting change is determined to be an insertion, the method proceeds to step 624. At step 624, the increment is determined to be a positive quantity and equal in magnitude to the number of rows to be inserted. If, at decision block 618, the intersecting change is determined to be a deletion, the method proceeds to step 626. At step 626, the increment is determined to be a negative quantity and equal in magnitude to the number of rows to be deleted. At step 628, the copy-paste change is transformed by the increment determined at steps 624 or 626.

Transforming the copy-paste change by the increment may include adding the increment to the indices of one of the portions of the split range. Since the increment may be either positive or negative, the affected indices may be either increased or decreased, respectively. For example, if the destination range is split at step 608 into two portions, one portion having indices lower than the location of the intersecting change, and the other portion having indices higher than the location of the intersecting change, the increment may be added to the indices of the portion having indices higher than the location of the intersecting change.

If the intersecting change is an insertion, the portion having indices higher than the location of the intersecting change may have its indices increased by the size of the insertion. If the insertion is a row insertion, only the row indices may be affected by the increment. If the insertion is a column insertion, then only the column indices of the copy-paste range may be affected by the increment.

Deletion of one or more rows or columns may be implemented in substantially the same manner as an insertion of one or more rows or columns, except that the indices are decreased rather than increased. The addition of a negative increment causes the indices of the portion higher than the location of the intersecting change to be reduced by the size of the deletion.

Adjusting the indices of cells in the copy-paste range does not affect the content of the cells themselves, nor does it affect the indices of individual characters contained in the string included in the cell. Only the indices that locate a cell within the spreadsheet are affected by this transform operation.

The indices transformed at step 628 may be either absolute indices, or relative indices. Absolute indices refer to a cell's absolute position within the spreadsheet, while relative indices refer to a cell's relative position relative to another cell. An example of an absolute index would be "A1" or "D12." These would refer to the cells in column "A", row "1," and column "D", row "12," respectively. An example of a relative reference would be "$R_2C_5$." This would refer to a cell that is two rows down and five columns to the right of the cell containing the reference. Another example of a relative reference would be "$R_{-3}C_{-2}$." This relative reference would refer to a cell that is three rows above and two columns to the cell containing the relative reference. Either the absolute reference or the relative reference may be adjusted by the increment at step 628. At step 630, the intersecting change is applied as received at step 604. At step 632, the transformed copy-paste operation is applied. Here, the copy-paste operation is applied as it was transformed at step 628. Further details of insertion and deletion of rows and columns intersecting a copy-paste change will be described with respect to FIGS. 7 and 8.

If, at decision block 606, it is determined that the intersecting change is a set-cell operation, then the method proceeds to decision block 610. A set-cell operation is generally an operation to change one or more cells and may include setting a cell's value, setting or editing a cell's formula, and setting or editing a cell's format. A cell's format may include text formatting, such as bolding or italicizing the font, changing a cell's size, and changing a cell's border. These set-cells operations may not require splitting the range of the copy-paste operation, as an insertion or deletion of rows or columns would. At decision block 610, the location of the set-cell operation is determined with respect to the source and destination range of the copy-paste operation.

If the location of the set-cell operation affects the source range of the copy-paste operation, the method proceeds to step 614, where the set-cell operation is applied to the instructed portion of the source range. At step 620, the copy-paste change is applied without transformation.

If, at decision block 610, it is determined that the location of the set-cell operation affects the destination range, the method proceeds to step 616, where the copy-paste change is applied as received. At step 622, the set-cell operation is applied to the portion of the destination range that it affects. In this way, the set-cell operation always "wins" and the set-cell operation is not overridden by the copy-paste operation. Further details of a set-cell change intersecting a copy-paste change are described with respect to FIGS. 9 and 10.

In some examples, a set-cell operation may affect both the source and the destination range. In these examples, the source will each be treated according to steps 614 and 620, and the destination range will be treated according to steps 616 and 622, as illustrated in FIG. 6. By applying transforms according to the method 600, the copy-paste operation and the intersecting change operation can both be applied to the model representing the collaborative spreadsheet while still capturing the intent of each user. Furthermore, since all devices in communication with the collaborative spreadsheet apply this method 600 to intersecting changes, network traffic is reduced.

FIG. 7 illustrates how an insert row operation from one user intersecting a copy-paste operation from another user may be reconciled according to the systems and methods described herein while still capturing the intent of both users. In FIG. 7, the users Charlie and Dave are both editing a collaborative spreadsheet, each on a separate device. State 710 depicts the state of the spreadsheet before changes are made. State 720 illustrates the state of the collaborative spreadsheet after both changes have been applied and reconciled using the operational transform methods described herein. Charlie initiates a copy-paste operation 704, while Dave initiates a row insertion operation 702. Charlie's and Dave's operations occur substantially concurrently, such that neither user, while he is performing his operation, is aware of the other user's change. This may occur if Charlie and Dave are working exactly simultaneously, or it may also occur if one or both of Charlie and Dave have slow network connections with high latency. In either situation, one user may not be aware of the most recent changes may be the other user.

At 704, Charlie initiates a copy-paste operation to copy the contents of cell D2 to the range D3:D5. Charlie's copy-paste operation hence has a source range 712 (cell D2) and a destination range 714 (cells D3:D5). At 702, Dave inserts a row 716 between row 3 and row 4 of the collaborative spreadsheet.

As shown in state 720, the original destination range 714 (cells D3:D5) is split into two portions at the location of the intersecting insertion, between cell D3 and range D4:D5. Next, the portion of the range having indices higher than the split is shifted down by one row. The portion is shifted by incrementing the indices of the portion according to the size of the insertion. In this example, one row was inserted, so the row indices of the original portion D4:D5 in the state 710 are incremented by one to result in the portion D5:D6 in the state 720. Since no column was inserted in this example, the column indices (each represented by a "D") were unchanged. The foregoing operational transform was applied to the copy-paste change instructions, not to the spreadsheet itself. Next, the spreadsheet was modified in accordance with the insert row change and the transformed copy-paste change.

Dave's row insertion change was applied to insert one row below row 3, resulting in a blank row at row 4. The contents of former rows 4 and 5 in the state 710 have been moved to rows 5 and 6 in state 720. Charlie's transformed copy-paste change was applied after the insertion. The transformed copy-paste change copied the contents of the source range D2 to the new destination range D3,D5:D6. Cell 722 (D2) remains as it was in state 710. Cells 724a-c indicate the transformed destination range of the copy-paste operation and show the results of the transformed operation. Cell 724a (D3) has been updated to reflect the copy-paste operation. Cell 724a contains the formula "=B3*C3." The user may input the formula in cell 724 as illustrated in FIG. 7, but the collaborative spreadsheet may internally store the relative formula as "=$R_0C_{-2}*R_0C_{-1}$," indicating that the contents of the cell located two columns to the left and in the same row as cell 712 should be multiplied by the contents of the cell located one column to the left and in the same row as cell 712. Any of the formulas described or illustrated herein may be implemented as a relative formulas in the general format $R_xC_y$, in which "R" is an indicator that a row index follows, "x" is a relative row index, "C" is an indicator that a column index follows, and "y" is a relative column index. The relative row index "x" specifies the number of rows (and direction, by its sign) separating the cell indicated by the relative formula from the cell containing the relative formula. The relative column index "y" specifies the number of column (and direction, by its sign) separating the cell indicated by the relative formula from the cell containing the relative formula. Any of the formulas described or illustrated herein may be implemented as an absolute formula in the general absolute format NZ. In this general absolute format, "N" specifies the column index and "Z" specifies the row index of the cell indicated by the absolute formula. In some examples, absolute formulas are represented to the user with a "$" symbol preceding one or more indices (i.e. $N$Z).

In the example shown in FIG. 7, the formula in the source range 722 (D2) is a relative formula and not an absolute formula, so the formula in D3 is also a relative formula and reflects this. Cell 726 is a blank cell, since it is in the blank row that was inserted in the blank row that was inserted below row 3 by Dave's relative insertion operation 702. Cell 724b now contains the formula "=B5*C5." Cell 724b, like cell 724a, contains the pasted relative formula from cell 722. Cell 724c has a similar formula as cell 724b. By transforming the ranges associated with the copy-paste operation, the copy-paste destination range is adjusted to account for the inserted row. The above description of transforming of copy-paste ranges and relative formulas also applies to the transforming of ranges with respect to the operations illustrated in FIGS. 8-10. While adjustments may be made to account for the different intersecting operations of FIGS. 8-10, similar principles are used. The example shown in FIG. 7 is illustrative, and in some examples, more than two users edit the collaborative spreadsheet. In another example, one user edits the collaborative spreadsheet from multiple devices.

FIG. 8 illustrates how a delete row operation from one user intersecting a copy-paste operation by another user may be reconciled according to the systems and methods described herein. State 810 shows the state of a collaborative spreadsheet being edited by users Charlie and Dave, prior to the application of any edits. State 820 illustrates the state of the collaborative spreadsheet after both users' changes have been applied and reconciled according to the systems and methods described herein.

At 802, Charlie provides a copy-paste input to copy the contents of the cell D2 to the range D3:D5. At 804, Dave, on his device, provides an input to delete row 4 of this spreadsheet. Charlie and Dave are editing the spreadsheet from separate devices, and, as described in FIG. 7, each makes a change while unaware of the other user's change. Thus, their changes must be reconciled according to the systems and methods described herein. Charlie's edit 802 to copy the contents of cell D2 in the source range 812 to cells D3:D5 in the destination range 814, are illustrated in 810. The range of Dave's delete row operation is row 4 illustrated at 816. The source range 822 is substantially the same as original source range 812, and cells 824a-b have now been updated according to Charlie's copy-paste operation 802. Dave's row deletion 804 has resulted in the range 816 being deleted from the spreadsheet. By transforming the ranges associated with the copy-paste operation, the copy-paste destination range is adjusted to account for the deleted row.

FIG. 9 illustrates how a set-cell operation from one user intersecting the source range of a copy-paste operation by another user may be reconciled according to the systems and methods described herein. State 910 shows the state of the collaborative spreadsheet edited by users Charlie and Dave, prior to application of changes. State 920 illustrates the state of the collaborative spreadsheet after both Charlie's and Dave's changes have been reconciled and applied. Dave and Charlie are each viewing the collaborative spreadsheet on their respective devices, according to a situation similar to that described with respect to FIG. 7.

At 902, Charlie provides an input to copy the contents of cell D2 in the source range 912 to the cells D3:D5 in the destination range 914. At 904, Dave, while unaware of Charlie's input, provides an input to change the formula in cell D2 to "=B2*C2*1.09." In some examples, this and other formulas are relative formulas as described with respect to FIG. 7. Since Charlie and Dave each makes a change while unaware of the other user's change, their changes must be reconciled according to the systems and methods described herein. Cell 922 is the source range of Charlie's copy-paste operation and cells 924a-c are the destination cells of Charlie's copy-paste operation. Since Dave's set-cell operation was applied to the source range of Charlie's copy paste operation, Dave's set-cell operation was applied to the collaborative spreadsheet before Charlie's copy-paste operation, as dictated by the method 600 of FIG. 6. In this manner, Dave's set-cell edit was also copied to Charlie's destination range. By performing the intersecting edits in the appropriate order, the copy-paste operation is adjusted to account for the set-cell operation, and the original intent of each user is preserved. Both Charlie and Dave will view the collaborative spreadsheet according to the view shown in 920.

FIG. 10 illustrates how a set-cell operation from one user intersecting the destination range of a copy-paste operation from another user may be reconciled according to the systems and methods described herein. Two users, Charlie and Dave, are each editing a collaborative spreadsheet on their respective devices, and each provides an input. State 1010 describes the state of the collaborative document before either user's change has been applied. State 1020 illustrates the state of the collaborative document after both Charlie's and Dave's changes have been reconciled and applied. At 1002, Charlie provides a copy-paste operation to copy the contents of cell D2 in source range 1012 to cells D3:D5 in destination range 1014. At step 1004, Dave, while unaware of Charlie's copy-paste input, provides an input to change the formula in cell D4 to "=B4*C4*1.09." Dave's set-cell input affects the destination range of Charlie's copy-paste operation. In some examples, the formula in cell D4 and other formulas are relative formulas as described with respect to FIG. 7. Since each user was unaware of the other user's input at the time of making their own input, the changes must be reconciled according to the systems and methods described herein. Cell 1022 is unchanged from the state 1010. Cells 1024a-b have been updated to reflect the results of Charlie's copy-paste operation. Cell 1026 has also been updated to reflect Charlie's copy-paste operation, but it has also been updated to reflect Dave's set-cell operation. Since Dave's set-cell operation intersected the destination range of Charlie's copy-paste operation, Charlie's copy-paste operation was applied first, and Dave's set-cell operation was applied second. This order is dictated by the method 600 of FIG. 6. By performing the conflicting edits in the appropriate order, the copy-paste operation is adjusted to account for the set-cell operation, and the original intent of each user is preserved in the reconciled changes. Both Charlie and Dave now view the collaborative spreadsheet as shown in state 1020 on each of their respective devices.

FIG. 11 illustrates the result of a tiled copy-paste operation in a collaborative spreadsheet and includes states 1110 and 1120. The state 1110 illustrates the state of the collaborative spreadsheet prior to the copy-paste operation being applied. The state 1110 includes a source range 1112 and a destination range 1114. As used herein, the term "tiling" describes a copy-paste operation in which the destination range is larger than the source range. In a tiled copy-paste operation, the contents of the source range are replicated multiple times into the destination range, according to the respective sizes of each of the ranges. Tiling may be used in any of the copy-paste operations described herein. The source range 1112 of the tiled copy-paste operation consists of two cells, cells A1 and A2. Cell A1 contains the text "AA," and cell A2 contains the text "BB." The destination range 1114 of the tiled copy-paste operation consists of 12 cells in the range C2:E5.

The state 1120 reflects the results of the tiled copy-paste operation, after the operation was applied to the collaborative spreadsheet. The state 1120 includes cells in the source range 1122a-b and cells in the destination range 1124a-m. The cells 1122a-b are unchanged, since they were the source cells of the operation. The cells 1124a-m now include the tiled contents of the cells 1122a-b. Since the destination range 1114 is larger in the column dimension than the source range 1112 by a factor of three, the source cells were tiled three times in the column dimension to result in the state 1120. Moreover, since the range 1114 is larger in the row dimension than the source range 1112 by a factor of two, the cells in the destination range 1112 were tiled twice in the row dimension to result in the state 1120. If the destination range 1114 had included an additional row (for example, if it instead consisted of the range C2:E6), the source range 1112 would still have been tiled only twice in the row dimension to result in the state 1120. This would have occurred since the factor by which the range 1114 was larger in the row dimension than the range 1112 would have been rounded down to the nearest integral amount for tiling purposes.

Tiling can be very desirable for a user, since a user can replicate a small number source cells into a very large destination range with minimal input. However, tiling, if not handled appropriately, may cause excessive transfers of data over a network when implemented in a collaborative spreadsheet. This may occur if the data in the destination range is transferred in some or all of its entirety to other devices on the network, such as the server and other client devices. If tiling were to be implemented in this way on the collaborative spreadsheet shown in the state 1120, the text in each of the cells 1124*a-m* would be transferred over the network. Thus, the data transferred over the network scales with the size of the destination range, such that the volume of data transferred may be quite large.

However, if tiling is implemented in a collaborative spreadsheet by transferring only instructions and range indices over the network, and the tiling is performed at each local device independently, data transfer may be reduced. In the example shown in the state 1120, only the specification of the source range and the destination range need to be transferred over the network to other devices, resulting in a fixed amount of data, regardless of the size of the source or destination ranges. In some examples, data contained in the source range may be transferred as well, along with the copy-paste instructions. In these examples, the data volume transferred over the network scales with the size of the source range, which still may be much smaller than the size of the destination range. These examples result in a smaller volume of network traffic than if data in the destination range is transferred in some or all of its entirety. Tiling as illustrated in FIG. 11 may be used in any of the copy-paste operations described herein.

Figure 12:
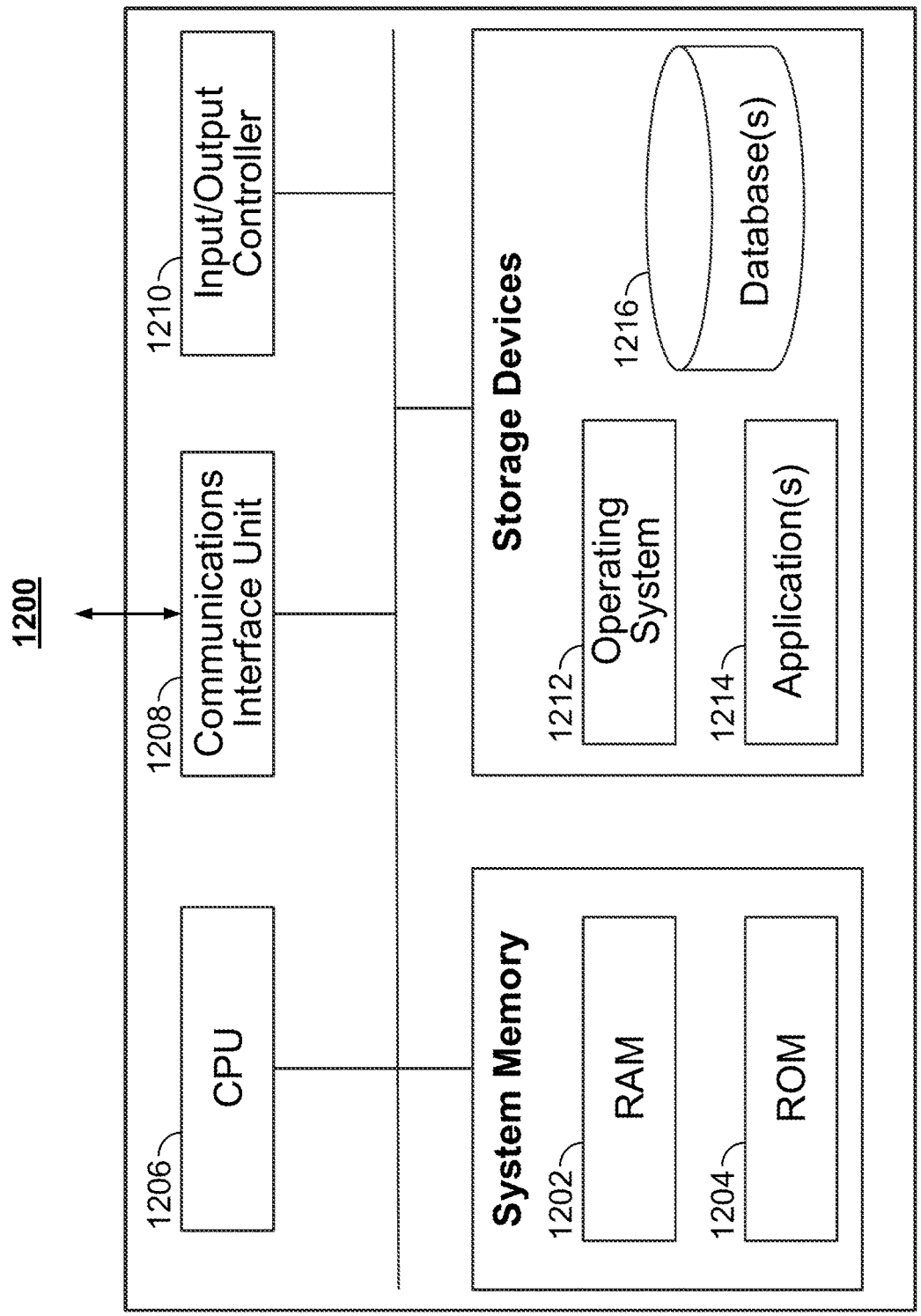
FIG. 12 is a block diagram of a computing device for performing any of the processes described herein, according to an illustrative implementation.

FIG. 12 is a block diagram of a computing device, such as any of the components of the systems of FIGS. 1-11, for performing any of the processes described herein. Each of the components of these systems may be implemented on one or more computing devices 1200. In certain aspects, a plurality of the components of these systems may be included within one computing device 1200. In certain implementations, a component and a storage device may be implemented across several computing devices 1200.

The computing device 1200 includes at least one communications interface unit, an input/output controller 1210, system memory, and one or more data storage devices. The system memory includes at least one random access memory (RAM 1202) and at least one read-only memory (ROM 1204). All of these elements are in communication with a central processing unit (CPU 1206) to facilitate the operation of the computing device 1200. The computing device 1200 may be configured in many different ways. For example, the computing device 1200 may be a conventional standalone computer or alternatively, the functions of computing device 1200 may be distributed across multiple computer systems and architectures. Alternatively, a computer system may be virtualized to provide the functions of multiple computing devices 1200. In FIG. 12, the computing device 1200 is linked, via network or local network, to other servers or systems.

The computing device 1200 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1208 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1206 includes a processor, such as one or more conventional microprocessors and one or more supplementary co-processors such as math co-processors for offloading workload from the CPU 1206. The CPU 1206 is in communication with the communications interface unit 1208 and the input/output controller 1210, through which the CPU 1206 communicates with other devices such as other servers, user terminals, or devices. The communications interface unit 1208 and the input/output controller 1210 may include multiple communication channels for simultaneous communication with, for example, other processors, servers or client terminals.

The CPU 1206 is also in communication with the data storage device. The data storage device may include an appropriate combination of magnetic, optical or semiconductor memory, and may include, for example, RAM 1202, ROM 1204, flash drive, an optical disc such as a compact disc or a hard disk or drive. The CPU 1206 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1206 may be connected to the data storage device via the communications interface unit 1208. The CPU 1206 may be configured to perform one or more particular processing functions.

The data storage device may store, for example, (i) an operating system 1212 for the computing device 1200; (ii) one or more applications 1214 (e.g., computer program code or a computer program product) adapted to direct the CPU 1206 in accordance with the systems and methods described here, and particularly in accordance with the processes described in detail with regard to the CPU 1206; or (iii) database(s) 1216 adapted to store information that may be utilized to store information required by the program.

The operating system 1212 and applications 1214 may be stored, for example, in a compressed, an uncompiled and an encrypted format, and may include computer program code. The instructions of the program may be read into a main memory of the processor from a computer-readable medium other than the data storage device, such as from the ROM 1204 or from the RAM 1202. While execution of sequences of instructions in the program causes the CPU 1206 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 1212, a database management system and "device drivers" that allow the processor to interface with computer peripheral devices (e.g., a video display, a keyboard, a computer mouse, etc.) via the input/output controller 1210.

The term "computer-readable medium" as used herein refers to any non-transitory medium that provides or participates in providing instructions to the processor of the computing device 1200 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1206 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1200 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A computer-implemented method for editing a collaborative spreadsheet hosted on a server, comprising:
    displaying, by a processor of a first user device, the collaborative spreadsheet hosted on the server and based on a first model stored on the first user device;
    receiving, by the processor of the first user device, a first input of the first user device to modify the collaborative spreadsheet;
    modifying, by the processor of the first user device, the first model based on the first input to obtain a second model;
    sending, by the processor to the server, the first input comprising a source range, a destination range, and an instruction to copy content from the source range to the destination range;
    receiving, by the processor and from the server, a second input of a second user device to modify a portion of the collaborative spreadsheet, wherein the second input comprises an instruction to modify content of the collaborative spreadsheet, wherein the content is to be modified in at least one of the source range or the destination range;
    subsequent to receiving from the server the second input of the second user device to modify the portion of the collaborative spreadsheet, determining, by the processor of the first user device, whether the first input sent to the server by the first user device has not been acknowledged by the server; and
    responsive to determining that the first input sent to the server has not been acknowledged by the server,
        transforming, by the processor of the first user device, the first input based on the second input to obtain a transformed first input based on a set of collaboration rules that are common to the first user device and the server,
        modifying, by the processor of the first user device, the second model based on the transformed first input to obtain a third model, and
        displaying, by the processor of the first user device, the collaborative spreadsheet based on the third model.

2. The method of claim 1, further comprising:
    responsive to determining that that the first input to the server has been acknowledged by the server,
        modifying the second model based on the second input of the second user device to obtain a fourth model, and
        displaying, by the processor of the first user device, the collaborative spreadsheet based on the fourth model.

3. The method of claim 1, wherein the first input further comprises a first revision number corresponding to the first model stored on the first user device.

4. The method of claim 1, wherein the destination range is larger than the source range, and the instruction to copy content includes an instruction to tile the content from the source range into the destination range.

5. A system comprising:
    a memory; and
    a processor, coupled to the memory, the processor to:
    display, by the processor of a first user device, a collaborative spreadsheet hosted on a server based on a first model stored on the first user device;
    receive, by the processor of the first user device, a first input of the first user device to modify the collaborative spreadsheet;
    send, by the processor to the server, the first input of the first user comprising a source range, a destination range, and an instruction to copy content from the source range to the destination range;
    modify, by the processor of the first user device, the first model based on the first input to obtain a second model;
    receive, by the processor and from the server, a second input of a second user device to modify a portion of the collaborative spreadsheet, wherein the second input comprises an instruction to modify content of the collaborative spreadsheet, wherein the content is to be modified in at least one of the source range or the destination range;
    subsequent to receiving from the server the second input of the second user device to modify the portion of the collaborative spreadsheet, determine, by the processor of the first user device, whether the first input sent to the server by the first user device has not been acknowledged by the server; and
    responsive to determining that the first input sent to the server has not been acknowledged by the server, transform, by the processor of the first user device, the first input based on the second input to obtain a transformed first input based on a set of collaboration rules that are common to the first user device and the server, modify, by the processor of the first user device, the second model based on the transformed first input to obtain a third model, and display, by the processor of the first user device, the collaborative spreadsheet based on the third model.

6. The system of claim 5, the processor further to:

responsive to determining that that the first input to the server has been acknowledged by the server, modify the second model based on the second input of the second user device to obtain a fourth model, and display, by the processor of the first user device, the collaborative spreadsheet based on the fourth model.

7. The system of claim 5, the first input further comprises a first revision number corresponding to the first model stored on the first user device.

8. The system of claim 5, wherein the destination range is larger than the source range, and the instruction to copy content includes an instruction to tile content from the source range into the destination range.

9. A non-transitory computer-readable medium comprising instructions that, responsive to execution by a processor, cause the processor to perform operations comprising:

displaying, by the processor of a first user device, a collaborative spreadsheet hosted on a server and based on a first model stored on the first user device;

receiving, by the processor of the first user device, a first input of the first user device to modify the collaborative spreadsheet;

modifying, by the processor of the first user device, the first model based on the first input to obtain a second model;

sending, by the processor to the server, the first input comprising a source range, a destination range, and an instruction to copy content from the source range to the destination range;

receiving, by the processor and from the server, a second input of a second user device to modify a portion of the collaborative spreadsheet, wherein the second input comprises an instruction to modify content of the collaborative spreadsheet, wherein the content is to be modified in at least one of the source range or the destination range;

subsequent to receiving from the server the second input of the second user device to modify the portion of the collaborative spreadsheet, determining, by the processor of the first user device, whether the first input sent to the server by the first user device has not been acknowledged by the server; and responsive to determining that the first input sent to the server has not been acknowledged by the server, transforming, by the processor of the first user device, the first input based on the second input to obtain a transformed first input based on a set of collaboration rules that are common to the first user device and the server, modifying, by the processor of the first user device, the second model based on the transformed first input to obtain a third model, and displaying, by the processor of the first user device, the collaborative spreadsheet based on the third model.

10. The non-transitory computer-readable medium of claim 9, wherein sending the first input of the first user device to the server, the operations further comprising:

sending a first revision number corresponding to the first model stored on the first user device to the server.

11. The non-transitory computer-readable medium of claim 9, the operations further comprising:

responsive to determining that that the first input to the server has been acknowledged by the server, modifying the second model based on the second input of the second user device to obtain a fourth model, and displaying, by the processor of the first user device, the collaborative spreadsheet based on the fourth model.

* * * * *